US010141980B2

(12) United States Patent
Hijikata

(10) Patent No.: US 10,141,980 B2
(45) Date of Patent: Nov. 27, 2018

(54) WIRELESS POWER TRANSMISSION SYSTEM, AND COMMUNICATION AND PROTECTION METHODS FOR THE SAME

(71) Applicant: MINEBEA MITSUMI Inc., Nagano (JP)

(72) Inventor: Hidetoshi Hijikata, Hamamatsu (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/958,017

(22) Filed: Apr. 20, 2018

(65) Prior Publication Data
US 2018/0316391 A1    Nov. 1, 2018

(30) Foreign Application Priority Data

Apr. 26, 2017   (JP) .................................. 2017-087034
May 19, 2017   (JP) .................................. 2017-100221

(51) Int. Cl.
| H04B 5/00 | (2006.01) |
| H02J 50/10 | (2016.01) |
| H02J 50/80 | (2016.01) |
| H04B 17/364 | (2015.01) |

(52) U.S. Cl.
CPC ............ *H04B 5/0037* (2013.01); *H02J 50/10* (2016.02); *H02J 50/80* (2016.02); *H04B 5/0081* (2013.01); *H04B 17/364* (2015.01)

(58) Field of Classification Search
CPC ............ H04M 5/0025; H04M 5/0037; H04M 5/0075; H02J 5/005; H02J 7/025; H02J 7/027; H02J 7/045; H02J 50/12; H02J 50/80; H02M 1/32; H02M 3/33505; H02M 3/3376; H02M 5/4585; H02M 7/125; H02M 7/217
USPC ............... 455/41.1, 41.2, 41.3; 307/104, 107
See application file for complete search history.

(56) References Cited

U.S. PATENT DOCUMENTS

| 5,867,775 | A | * | 2/1999 | Shirai | .................. G08B 29/181 |
| | | | | | 455/115.1 |
| 6,504,732 | B2 | * | 1/2003 | Abe | ...................... H02M 1/096 |
| | | | | | 363/16 |
| 9,515,546 | B2 | * | 12/2016 | Awane | ................. H02M 1/4258 |
| 9,853,505 | B2 | * | 12/2017 | Liu | ........................ H02M 7/219 |

(Continued)

FOREIGN PATENT DOCUMENTS

JP    2011-139621 A    7/2011

*Primary Examiner* — Quochien B Vuong
(74) *Attorney, Agent, or Firm* — Pearne & Gordon LLP

(57) ABSTRACT

The wireless power transmission system includes a power supply device and a power receiving device. The power supply device includes a power supply coil, an inverter driving the power supply coil and a radio and a first processor. The power receiving device includes a resonant circuit wirelessly receiving electric power from the power supply coil, a rectifying circuit DB outputting a rectified voltage, a load, a radio unit and a second processor. The second processor transmits a communication packet in a predetermined period of time, the communication packet including information about a rectified voltage value and a circulation index value indicating transmission sequence. The first processor outputs a signal according to the rectified voltage value included in the communication packet every time the first processor receives the communication packet without delay.

17 Claims, 21 Drawing Sheets

(56) References Cited

U.S. PATENT DOCUMENTS

| | | | |
|---|---|---|---|
| 9,935,501 B2* | 4/2018 | Cho ........................ | H02J 50/90 |
| 2012/0223591 A1* | 9/2012 | Cheon .................... | H02H 3/202 |
| | | | 307/104 |

* cited by examiner

| POWER SUPPLY SIDE OPERATION / POWER RECEIVING SIDE CHANGE | OCCURRENCE OF LOAD FLUCTUATION | THRESHOLD |
|---|---|---|
| LED POWER ON | YES | 12 |
| LED POWER OFF | YES | 10 |
| LIGHT CONTROL +10% | YES | 7 |
| LIGHT CONTROL -10% | YES | 5 |
| COLOR TONING | NO | 0 |
| LED SLOW START | NO | 0 |

WIRELESS POWER TRANSMISSION SYSTEM, AND COMMUNICATION AND PROTECTION METHODS FOR THE SAME

CROSS REFERENCE TO RELATED APPLICATIONS

This application claims the benefit of Japanese Patent Applications No. 2017-087034, filed Apr. 26, 2017 and No. 2017-100221, filed May 19, 2017, which are hereby incorporated by reference in their entirety.

BACKGROUND

Technical Field

The present disclosure relates to a wireless power transmission system, and communication and protection methods for the same.

Background

Apparatuses equipping a wireless power transmission technology are becoming more common recently, the wireless power transmission technology being a technology for transmitting electric power without using a metal contact and a connector. The wireless power transmission is also called wireless power supply and non-contact power transmission.

The wireless power transmission is mainly classified into a system for supplying electric power by converting electric power to an electromagnetic wave (microwave), a system utilizing a resonant phenomenon of electric field coupling, and a system magnetic field coupling. The type of utilizing a resonant phenomenon of a magnetic field based on the magnetic field coupling is, for example, disclosed in the disclosure according to Japanese Patent Application Laid-Open No. 2011-139621.

As described in Solution of Abstract in Japanese Patent Application Laid-Open No. 2011-139621, "Electric power is transmitted by magnetic resonance from a power supply coil L2 to a power receiving coil L3. VCO 202 alternately turns on and off a switching transistor Q1 and a switching transistor Q2 at a driving frequency fo, supplies AC power to the power supply coil L2, and supplies the AC power from the power supply coil L2 to the power receiving coil L3. A phase detection circuit 114 detects a phase difference between a current phase and a voltage phase, and VCO 202 adjusts the driving frequency fo so that the phase difference becomes zero. When a load voltage changes, a detection value of the current phase is adjusted and, as a result, the driving frequency fo is adjusted."

SUMMARY

In order to stabilize a rectified voltage value of a wireless power transmission system, information about the rectified voltage value can be wirelessly feedback to a power supply device. Such a wireless power transmission system using wireless communication packets (data), for example, periodically transmits a voltage value from a power receiving device to a power supply device through a radio module (Bluetooth (registered trademark)). The power supply device executes feedback control based on the received voltage value.

In such a wireless power transmission system, a communication loss due to a communication packet loss, and a communication delay due to a communication packet loss recovery at delayed timing occur upon receiving crosstalk and interference, and electromagnetic noise and the like from other radio communication apparatuses, thereby causing feedback delay.

A time constant of an error amplifier controlling an inverter circuit may be set longer than a communication period of time by taking the feedback delay into consideration. However, improper control may be performed without being capable of following the voltage fluctuation when the feedback delay is extended. The improper control causes dispersion and vibration in the rectified voltage of the power receiving device, so that an upper system (load) of the power receiving device cannot operate stably.

A first aspect of the present disclosure is related to providing a wireless power transmission system capable of preventing dispersion and vibration from being generated in a rectified voltage of a power receiving device even when a feedback delay is extended.

There is a problem whereby the protection operation is performed when the rectified voltage exceeds a predetermined voltage range even if the expected fluctuation in the rectified voltage (the voltage fluctuation according to the instruction from the upper system) occurs. The rectified voltage may be temporarily beyond the predetermined voltage range when the load as the upper system of the power receiving device drops and utilizes the rectified voltage. Then, the power receiving device and the load of the power receiving device may not be operated if the wireless power transmission is stopped as a protection operation of the power supply device, for example.

A second aspect of the present disclosure is related to providing a wireless power transmission system not performing a protection operation on expected fluctuation in a rectified voltage.

According to a first aspect of the present disclosure, a wireless power transmission system includes a power supply device and a power receiving device.

The power supply device includes a power supply coil wirelessly transmitting electric power, an inverter driving the power supply coil, a first radio unit performing radio communication with the power receiving device, and a first processor controlling the first radio unit and the inverter.

The power receiving device includes a resonant circuit including a power receiving coil wirelessly receiving electric power from the power supply coil of the power supply device and a capacitor to generate a resonant voltage, a rectifying circuit rectifying the resonant voltage to output a rectified voltage, a second radio unit performing radio communication with the first radio unit included in the power supply device, and a second processor controlling the second radio unit.

The second processor transmits a communication packet to the power supply device in a predetermined period of time and the communication packet includes information about a rectified voltage value generated based on the rectified voltage and a circulation index value indicating a transmission sequence.

The first processor outputs a signal according to the rectified voltage value included in the communication packet every time the first processor receives the communication packet without delay.

According to a second aspect of the present disclosure, a wireless power transmission system includes a power supply device and a power receiving device.

The power supply device includes a power supply coil wirelessly transmitting electric power, an inverter driving the power supply coil, a first radio unit performing radio communication with the power receiving device, and a first processor controlling the first radio unit and the inverter.

The power receiving device includes a resonant circuit including a power receiving coil wirelessly receiving electric power from the power supply coil of the power supply device and a capacitor to generate a resonant voltage, a rectifying circuit rectifying the resonant voltage to output a rectified voltage, a load driven by the rectified voltage, a second radio unit performing radio communication with the first radio unit included in the power supply device, and a second processor controlling the load and the second radio unit.

The second processor generates information about a rectified voltage value based on the rectified voltage, and sets or clears fluctuation information indicating whether the fluctuation in the rectified voltage value is expected fluctuation, to transmit information including the rectified voltage value and the fluctuation information to the first radio unit included in the power supply device.

The other means will be described below.

According to the present disclosure, a wireless power transmission system can prevent dispersion and vibration from being generated in a rectified voltage of a power receiving device even when a feedback delay is extended.

The upper system can be continuously operated even If the expected fluctuation in the rectified voltage occurs.

DETAILED DESCRIPTION

Hereinafter, a first embodiment of the present disclosure will be described in detail with reference to FIGS. 1 to 13, and a second embodiment of the present disclosure will be described in detail with reference to FIG. 1, FIG. 2, and FIGS. 14 to 22.

First Embodiment

A wireless power transmission system using radio communication packet in a first embodiment eliminates crosstalk based on identification information set in each device, and minimizes communication packet losses by automatically adjusting the radio output level. The wireless power transmission system further eliminates a communication delay due to communication packet loss recovery at the delayed timing based on a circulation index value. Thus, the wireless power transmission system can perform the feedback control at original timing and with a proper voltage value.

Figure 1:
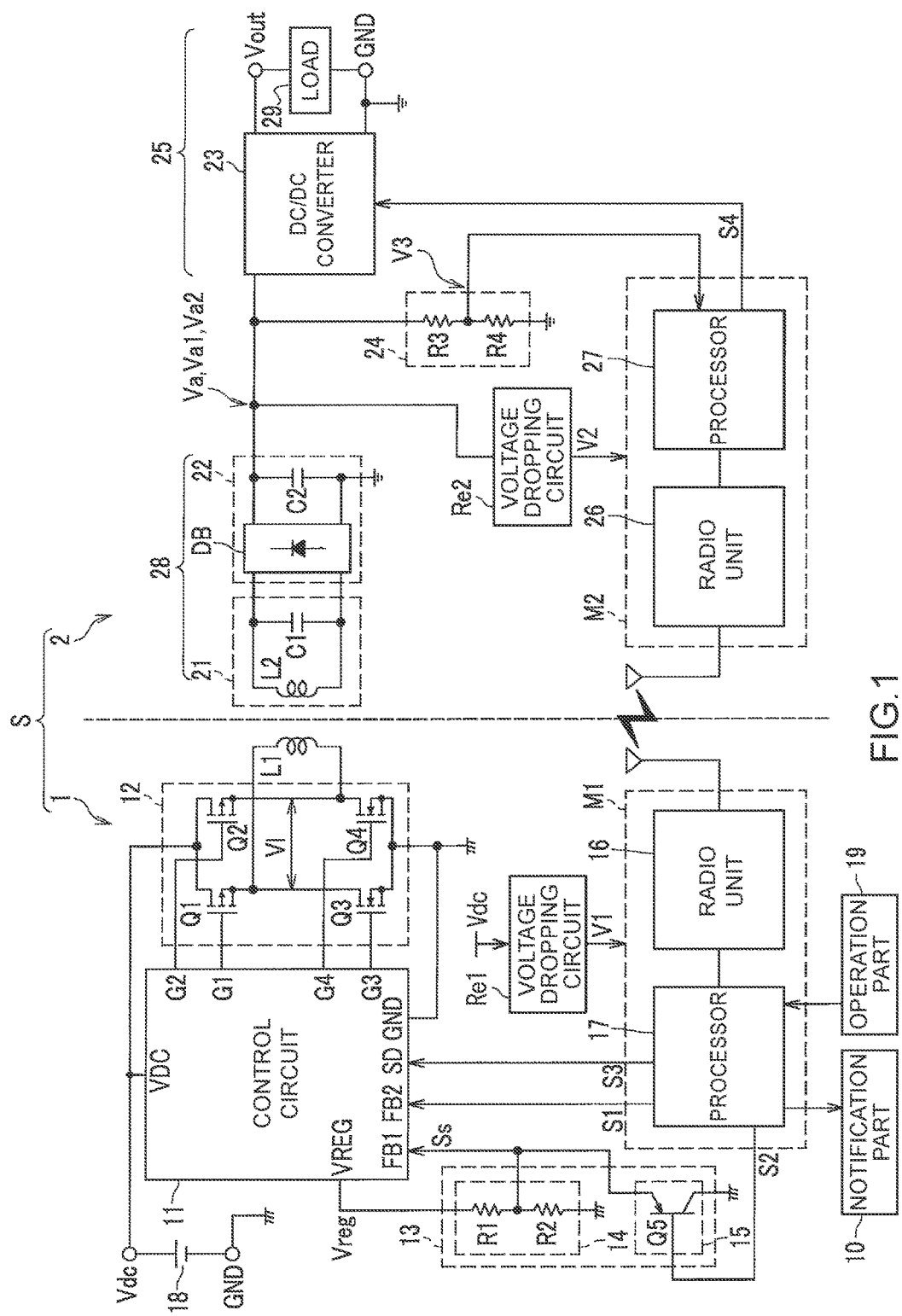
FIG. 1 is a schematic configuration diagram illustrating a wireless power transmission system in the both of first and second embodiments.

FIG. 1 is a configuration diagram illustrating a wireless power transmission system S in the both of first and second embodiments.

The wireless power transmission system S is a system for transmitting electric power from a power supply device 1 to a power receiving device 2 utilizing magnetic field coupling. Hereinafter, the configurations of a power supply side and a power receiving side will be described.

The power supply device 1 as the power supply side is configured to include a DC power source 18, a control circuit 11, an inverter circuit 12, a power supply coil L1, an initial voltage control circuit 13, a radio module M1, a voltage dropping circuit Re1, an operation part 19, and a notification part 10.

The control circuit 11 controls the inverter circuit 12 by generating gate signals G1 to G4 based on signals output by the initial voltage control circuit 13 and the radio module M1. The gate signals G1 to G4 are driving control signals for controlling the inverter circuit 12. A power source terminal VDC of this control circuit 11 is connected to the DC power source 18, and a DC voltage Vdc is applied so that the control circuit 11 operates. Furthermore the control circuit 11 applies a predetermined constant voltage Vreg from a constant voltage terminal VREG to the initial voltage control circuit 13. This control circuit 11 generates the gate signals G1 to G4 based on the rectified voltage information received by the radio module M1, so that an on-duty of pulse electric power is variably controlled, and controls the inverter circuit 12.

The inverter circuit 12 is, for example, a full-bridge circuit comprising a PMOS (Q1, Q2) and an NMOS (Q3, Q4), and outputs pulse electric power to the power supply coil L1 for driving at a resonance frequency on a side of the power receiving device 2. The inverter circuit 12 is connected to the DC power source 18, and the DC voltage Vdc is applied so that the inverter circuit 12 operates. The inverter circuit 12 applies a rectangular-wave voltage to the power supply coil L1 to drive this power supply coil L1. A triangular-wave (saw-tooth shaped) current flows in the power supply coil L1 so that the power supply coil L1 wirelessly transmits the electric power to the power receiving device 2. Note that the inverter circuit 12 may comprise NMOSs only.

The initial voltage control circuit 13 includes an initial voltage setting circuit 14 for setting an initial voltage, and an initial voltage setting release circuit 15 for releasing setting of the initial voltage. Specifically, the initial voltage setting circuit 14 is configured to include voltage dividing resistors R1 and R2. The initial voltage setting release circuit 15 is configured to include a transistor Q5, and drops a node of the initial voltage to a potential of the ground, the node being a connection point of the voltage dividing resistors R1 and R2. The initial voltage control circuit 13 operates with a predetermined constant voltage Vreg being applied from a constant voltage terminal VREG of the control circuit 11, and outputs an initial driving control signal Ss to a terminal FB1. The control circuit 11 sets an initial value of an on-duty of the gate signals G1 to G4 based on the initial driving control signal Ss. Then, the wireless power transmission enters an idling state, and a secondary power source part 28 of the power receiving device 2 described later supplies a first predetermined voltage Va1 (e.g., 5 V) capable of operating a radio module M2.

The radio module M1 is configured to include, for example, a radio unit 16 in accordance with Bluetooth (registered trademark) Low Energy, and a processor 17. The radio unit 16 (first radio unit) transmits and receives a signal through a radio communication path between the radio unit 16 and a radio unit 26 of the power receiving device 2. Note that both an electric field intensity of the radio unit 16 and an electric field intensity of the radio unit 26 described later are at most 35 V/m.

Note that the communication between the radio unit 16 and the radio unit 26 is not limited to radio wave communication, and may be radio communication such as visible light communication, infrared communication, and ultrasonic communication, while no limitation is imposed on this communication.

The processor 17 (first processor) is a microcomputer provided with, for example, a storage part and a processing device, and executes a power supply control program (not illustrated) to control the control circuit 11 and the initial voltage setting release circuit 15. Specifically, the processor 17 outputs a control signal (first control signal) S1 to a terminal FB2 of the control circuit 11 to feedback control the electric power to be supplied to the power receiving side. Moreover, the processor 17 outputs a control signal (second control signal) S2 to a base of the transistor Q5 of the initial voltage setting release circuit 15, turns on the transistor Q5, and sets the initial driving control signal Ss to 0 V. Furthermore, the processor 17 outputs a control signal (third control signal) S3 to a terminal SD, and shuts down the control circuit 11.

The processor 17 acquires operation information from the operation part 19 as an upper system of the power supply device 1, the operation part 19 comprising an operation switch, a touch panel, and the like. The processor 17 transmits the operation information acquired from the operation part 19 to the power receiving device 2 through the radio unit 16, enabling a user to operate a load 29. The load 29 is, for example, an LED (light emitting diode) illumination.

Furthermore, the processor 17 outputs an alarm to the notification part 10 as an upper system of the power supply device 1, the notification part 10 comprising a liquid crystal display, a speaker, and the like to notify the user of an error relating to the wireless power transmission.

The radio module M1 operates by electric power of a driving voltage V1 (e.g., 3.3 V) supplied from the voltage dropping circuit Re1. The voltage dropping circuit Re1 is an element for supplying the electric power of the driving voltage V1 when the DC voltage Vdc is applied to the voltage dropping circuit Re1.

The power receiving device 2 as the power receiving side is configured to include a resonant circuit 21, a rectifying circuit 22, a DC/DC converter (DC conversion circuit; one example of a load) 23, a voltage dividing circuit 24, the radio module M2, and a voltage dropping circuit Re2.

The resonant circuit 21 is an LC resonant circuit comprising a power receiving coil L2 and a resonant capacitor C1, the power receiving coil L2 and the resonant capacitor C1 being connected in parallel. The resonant circuit 21 wirelessly receives the electric power from the power supply coil L1 of the power supply device 1 to generate a resonant voltage.

The rectifying circuit 22 is configured to include a diode bridge DB for rectifying an input alternating current to a direct current and a smoothing capacitor C2 for smoothing the rectified voltage. In this manner, the electric power of the rectified voltage Va is output to be supplied to the DC/DC converter 23, the voltage dividing circuit 24, and the voltage dropping circuit Re2. The secondary power source part 28 is configured to include the resonant circuit 21 and the rectifying circuit 22.

The radio module M2 is configured to include, for example, the radio unit 26 in accordance with Bluetooth (registered trademark) Low Energy, and a processor 27. The radio module M2 operates by electric power of a driving voltage V2 (e.g., 3.3 V) supplied from the voltage dropping circuit Re2.

The radio unit 26 (second radio unit) transmits and receives a signal through a radio communication path between the radio unit 26 and the power supply device 1. The processor 27 (second processor) is a microcomputer provided with, for example, a storage part and a processing device, and executes a power receiving control program (not illustrated) to control the DC/DC converter 23. Moreover, the processor 27 measures a detection voltage V3 to generate rectified voltage information, and transmits this rectified voltage information to the power supply device 1 by the radio unit 26. Furthermore, the processor 27 outputs a control signal S4 to the DC/DC converter 23 to activate or deactivate this DC/DC converter 23.

The processor 27 further receives the operation information input from the operation part 19 of the power supply device 1 through the radio unit 26, and controls the DC/DC converter 23 and the load 29 based on this operation information.

When the DC/DC converter 23 is supplied with electric power of a second predetermined voltage Va2 (e.g., 12 V) from the secondary power source part 28, the DC/DC converter 23 serves as a circuit for converting the electric power to electric power of another output voltage Vout. The load 29 is driven by the output voltage Vout of the DC/DC converter 23. The DC/DC converter 23 operates so that the output voltage Vout is constant even if the second predetermined voltage Va2 fluctuates. Therefore, the load 29 can be stably operated. The DC/DC converter 23 and the load 29 are equivalent to a load part 25 in this power receiving device 2. The DC/DC converter 23 is activated or deactivated based on a control signal (fourth control signal) S4 output from the radio module M2.

The voltage dividing circuit 24 is configured to include voltage dividing resistors R3 and R4, and applies a detection voltage V3 obtained by dividing the rectified voltage Va to the processor 27 of the radio module M2.

The radio module M2 operates by the electric power of the driving voltage V2 (e.g., 3.3 V) supplied from the voltage dropping circuit Re2. The voltage dropping circuit Re2 is an element for supplying the electric power of the driving voltage V2 to the radio module M2 in this example when the rectified voltage Va is applied to the voltage dropping circuit Re2.

Figure 2:
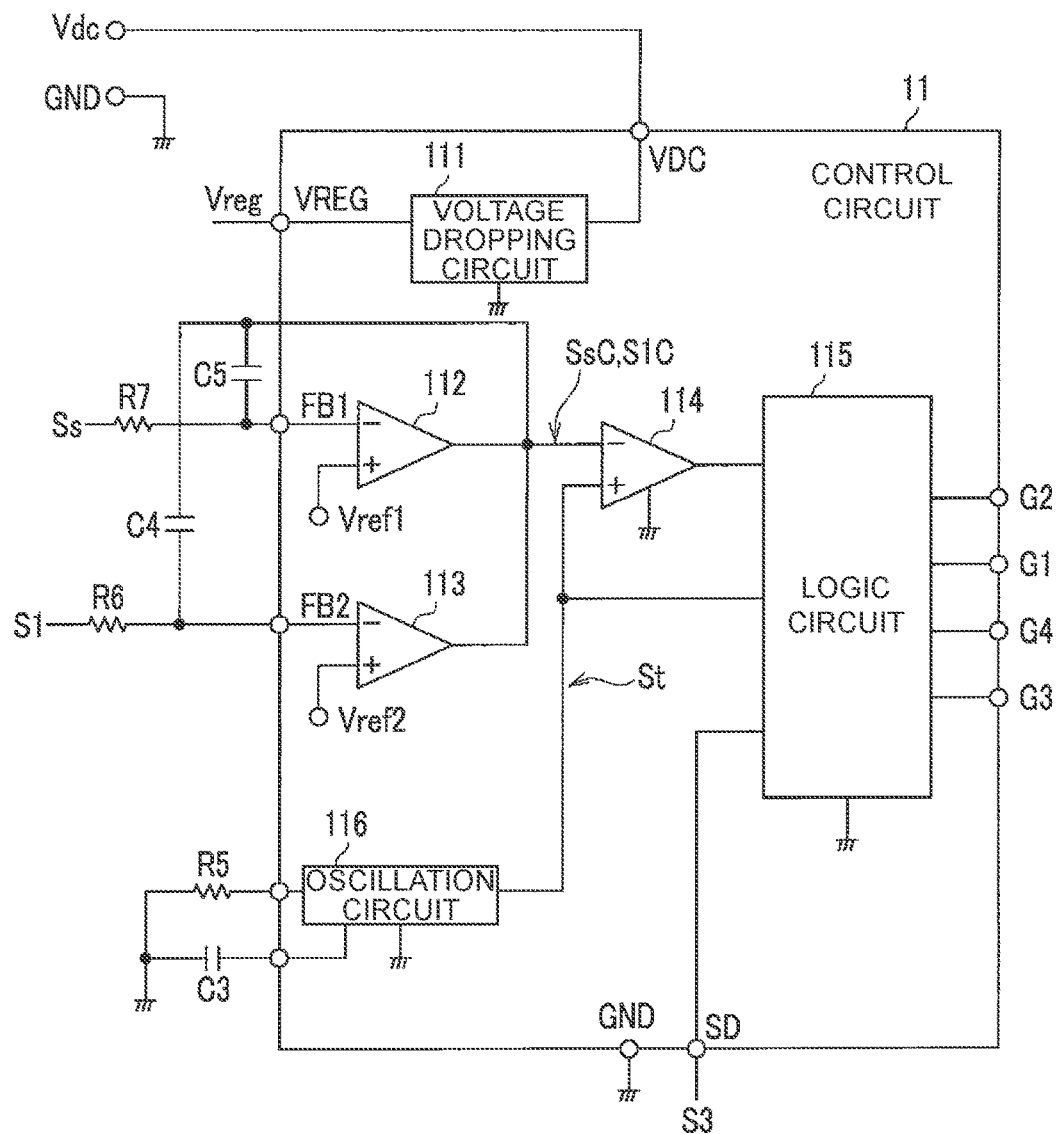
FIG. 2 is a configuration diagram illustrating a control circuit in the both of first and second embodiments.

FIG. 2 is a configuration diagram illustrating the control circuit 11 in the both of first and second embodiments.

The control circuit 11 is configured to include a voltage dropping circuit 111, operational amplifiers 112, 113, a comparator 114, a logic circuit 115, and an oscillation circuit 116. This control circuit 11 includes a power source terminal VDC, a ground terminal GND, a constant voltage terminal VREG outputting a constant voltage Vreg, terminals FB1, FB2 and SD on the input side, and terminals G1, G2, G3, G4 on the output side.

The DC voltage Vdc is applied to the power source terminal VDC, and the ground terminal GND is connected to the ground.

The voltage dropping circuit 111 is a circuit generating a constant voltage Vreg. For example, a regulator is connected to the power source terminal VDC and the ground terminal GND, and the voltage dropping circuit 111 outputs the constant voltage Vreg generated from the DC voltage Vdc at the constant voltage terminal VREG.

The operational amplifier 112, a resistor R7, and a capacitor C5 constitute an integration circuit. One end of the resistor R7 is connected to an inversion input terminal of the operational amplifier 112 through the terminal FB1. One end of the capacitor C5 is connected to the inversion input terminal of the operational amplifier 112 through the terminal FB1, and the other end of the capacitor C5 is connected to an output terminal of the operational amplifier 112. A reference voltage Vref1 is applied to a non-inversion input terminal of the operational amplifier 112.

This integration circuit outputs an output signal SsC obtained by integrating a potential difference between the reference voltage Vref1 and the initial driving control signal Ss when the initial driving control signal Ss is input to the other end of the resistor R7. This integration circuit controls with an integration time constant $\tau_s$ so that the initial driving control signal Ss is equal to the reference voltage Vref1. The initial driving control signal Ss is input from the initial voltage setting circuit 14 of the initial voltage control circuit 13.

The operational amplifier 113, a resistor R6, and a capacitor C4 constitute an integration circuit. One end of the resistor R6 is connected to an inversion input terminal of the operational amplifier 113 through the terminal FB2. One end of the capacitor C4 is connected to the inversion input terminal of the operational amplifier 113 through the terminal FB2, and the other end of the capacitor C4 is connected to an output terminal of the operational amplifier 113. A reference voltage Vref2 is applied to a non-inversion input terminal of the operational amplifier 113.

This integration circuit outputs an output signal S1C obtained by integrating a potential difference between the reference voltage Vref2 and the control signal S1 when the control signal S1 is input to the other end of the resistor R6. This integration circuit controls with an integration time constant $\tau_1$ so that the control signal S1 is equal to the reference voltage Vref2. The control signal S1 is input from the processor 17 of the radio module M1. Note that these operational amplifiers 112, 113 are collector outputs, and respective output terminals of the operational amplifiers 112, 113 are connected.

The output terminals of these operational amplifiers 112, 113 are connected to an inversion input terminal of the comparator 114, and either of the output signal SsC or the output signal S1C, whichever has a lower voltage, is input to the inversion input terminal of the comparator 114. A triangular wave signal St of the oscillation circuit 116 is input to a non-inversion input terminal of the comparator 114. In this manner, it is possible to generate an on-duty pulse signal depending on the voltage applied to the inversion input terminal.

The logic circuit 115 has an input side connected to an output terminal of the comparator 114, the triangular wave signal St, and the terminal SD, and an output side connected to an output terminal of the gate signal. This logic circuit 115 generates the gate signals G1, G2 and the gate signals G3, G4, respectively from an uppermost peak and a lowermost peak of the triangular wave signal St as well as a falling pulse signal input from the comparator 114. When a control signal S3 is input to the terminal SD from the processor 17 of the radio module M1, the logic circuit 115 stops an output operation of the gate signals G1 to G4.

The oscillation circuit 116 is connected to a resistor R5 and a capacitor C3, and oscillates to output a triangular wave.

Figure 3:
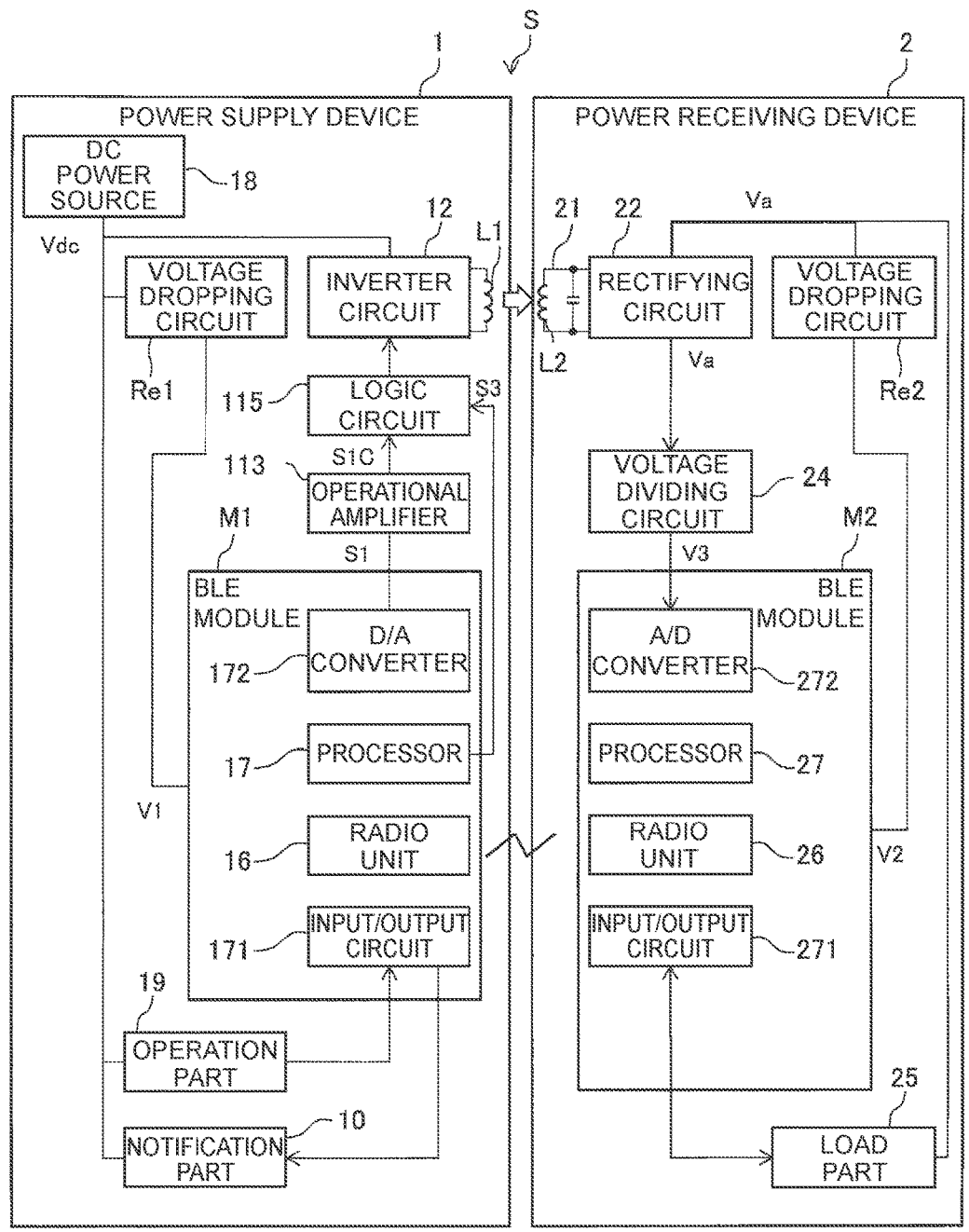
FIG. 3 is a block diagram illustrating the wireless power transmission system in the first embodiment.

FIG. 3 is a block diagram illustrating the wireless power transmission system S.

In the wireless power transmission system S illustrated in FIG. 3, each part illustrated in FIG. 1 is schematically illustrated. The wireless power transmission system S is configured to include the power supply device 1 and the power receiving device 2.

The power supply device 1 is configured to include the DC power source 18, the operational amplifier 113, the logic circuit 115, the inverter circuit 12, the power supply coil L1, the radio module M1, the voltage dropping circuit Re1, the operation part 19, and the notification part 10. Note that the radio module M1 is referred to as "BLE module." Note that the processor 17 may include an input/output circuit 171 and a D/A converter 172. The D/A converter 172 may be configured to be included in the power supply device 1 instead of being included in the radio module M1.

The DC power source 18 applies a DC voltage Vdc to the voltage dropping circuit Re1, the inverter circuit 12, the operation part 19 and the notification part 10. The voltage dropping circuit Re1 applies a driving voltage V1 to the radio module M1.

The radio module M1 includes the processor 17, the radio unit 16, the input/output circuit 171, and the D/A converter 172. The processor 17 integrally controls the radio module M1. The input/output circuit 171 obtains the operation information from the operation part 19, and outputs the alarm to the notification part 10. The D/A converter 172 outputs an analog control signal S1 to the operational amplifier 113.

The power receiving device 2 is configured to include the power receiving coil L2, the rectifying circuit 22, the voltage dividing circuit 24, the radio module M2, the voltage dropping circuit Re2, and the load part 25. Note that the radio module M2 is referred to as "BLE module." The rectifying circuit 22 supplies a rectified voltage Va to the voltage dividing circuit 24, the voltage dropping circuit Re2, and the load part 25. The voltage dropping circuit Re2 supplies a driving voltage V2 to the radio module M2.

The radio module M2 includes the processor 27, the radio unit 26, an input/output circuit 271, and an A/D converter 272. The voltage dividing circuit 24 includes voltage dividing resistors for dividing the rectified voltage Va. The voltage dividing circuit 24 outputs, to the A/D converter 272 of the radio module M2, the detection voltage V3 obtained by dividing the rectified voltage Va. Note that the processor 27 may include the input/output circuit 271 and the A/D converter 272. The A/D converter 272 may be configured to be included in the power receiving device 2 instead of being included in the radio module M2.

<<Operation of Wireless Power Transmission System S>>

The inverter circuit 12 of the power supply device 1 drives the power supply coil L1. In the power receiving device 2, electric power is generated in the power receiving coil L2 by the electromagnetic induction. This electric power is rectified into a rectified voltage Va by the rectifying circuit 22, the rectified voltage Va is divided into a detection voltage V3 by the voltage dividing circuit 24, and the detection voltage V3 is periodically measured by the A/D converter 272. The processor 27 of the power receiving device 2 transmits the detection voltage V3 measured by the A/D converter 272 to the power supply device 1 through the radio unit 26.

The processor 17 of the power supply device 1 controls the D/A converter 172 to convert the rectified voltage value included in the communication packet received through the radio unit 16 into a control signal S1 being an analog voltage. The D/A converter 172 continuously outputs the analog voltage based on a previous rectified voltage value to the operational amplifier 113 until the D/A converter 172 receives the communication packet including a new rectified voltage value. The operational amplifier 113 outputs an output signal S1C obtained by integrating the input analog voltage to the logic circuit 115 through a comparison part with a triangular wave (not illustrated). The logic circuit 115 drives an inverter circuit 12 at a duty according to the output signal S1C. By controlling as described above, the wireless power transmission system S is a feedback system for controlling so that the rectified voltage Va of the power receiving device 2 is stable at a voltage of 12 V (target value).

The processor 17 of the power supply device 1 acquires operation information input from the operation part 19 through the input/output circuit 171, and transmits the operation information through the radio unit 16. The processor 27 of the power receiving device 2 receives the operation information from the radio unit 26 to control the load part 25.

The processor 17 of the power supply device 1 stops the inverter circuit 12 for a protection operation and outputs an alarm to the notification part 10 when the processor 17 has not received the communication packet from the power receiving device 2 over a predetermined period of time. If the processor 17 has received the communication packet from the power receiving device 2 delayed for more than a predetermined time, the processor 17 ignores this communication packet. Moreover, the processor 17 instructs the power receiving device 2 to increase the radio output level when the accumulated value of the number of losses in the communication packets to be received from the power receiving device 2 exceeds a predetermined threshold. The processor 17 instructs the power receiving device 2 to perform the protection operation when the processor 17 instructs the power receiving device 2 to maximize the radio output level and the number of losses in the communication packets to be received from the power receiving device 2 exceeds the predetermined threshold. Furthermore, the processor 17 instructs the power receiving device 2 to decrease the radio output level if the processor 17 has not determined the losses of the communication packets over a predetermined period of time.

Figure 4:
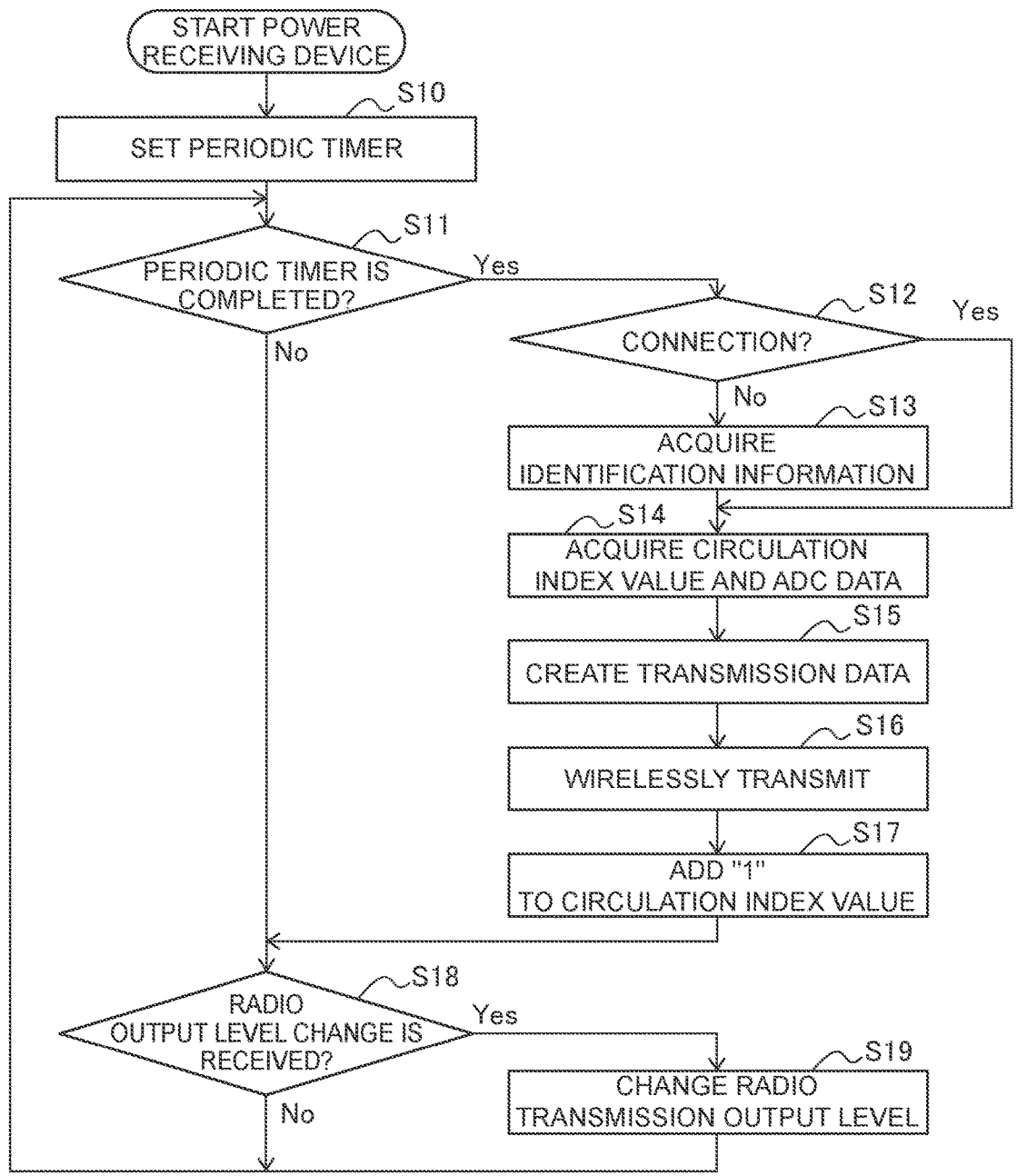
FIG. 4 is a flowchart illustrating the process of a power receiving device in the first embodiment.

FIG. 4 is a flowchart illustrating the process of the power receiving device 2. The process illustrated in FIG. 4 is started when the processor 27 of the power receiving device 2 is started.

In the power receiving device 2, a periodic timer for periodically feeding back a voltage value is set at a preset value (step S10). Every time the periodic timer is completed (Yes in step S11), the power receiving device 2 combines a circulation index value with the voltage value measured based on the rectified voltage received from the power receiving coil to create transmission data, and transmits the transmission data as a communication packet in processes of steps S12 to S17.

The processor 27 proceeds to step S12 when the periodic timer is completed (Yes in step S11), and determines whether the power receiving device 2 is connected to the power supply device 1. The periodic timer on this power receiving side is automatically restarted every time the periodic timer is completed. If the processor 27 determines that the power receiving device 2 is not connected to the power supply device 1 (No), the processor 27 acquires identification information preset at the power receiving device 2 (step S13), and proceeds to the process in step S14. If the processor 27 determines that the power receiving device 2 is connected to the power supply device 1, the processor 27 proceeds to the process in step S14.

In step S14, the processor 27 acquires the circulation index value, and further acquires, from the A/D converter 272, A/D conversion data obtained by converting the detection voltage V3 to digital. The periodic timer of the first embodiment is completed every 7.5 milliseconds. Note that in the figures, the A/D converter 272 is referred to as "ADC," and the A/D conversion data is referred to as "ADC data." The circulation index value is information for indicating transmission sequence, and, for example, 8-bit information.

The processor 27 generates information about the rectified voltage value based on this A/D conversion data, creates transmission data based on the rectified voltage value and the circulation index value, and the identification information if the power receiving device 2 is not connected to the power supply device 1 (step S15), and transmits the transmission data as a communication packet through the radio unit 26 (step S16). Then, the processor 27 adds a "1" to the circulation index value (step S17), and proceeds to the process in step S18. Note that when the processor 27 adds a "1" to the circulation index value of FF (hexadecimal), the circulation index value is returned to zero. In other words, the processor 27 adds a "1" of a predetermined value to the circulation index value every time the processor 27 transmits the communication packet to the power supply device 1. Furthermore, the processor 27 performs control so that this circulation index value becomes 00 of a minimum value of a predetermined range from 00 to FF (hexadecimal) if the circulation index value exceeds FF of a maximum value of the predetermined range. Hereinafter, in the specification and the drawing, the circulation index value is specified in hexadecimal with two digits.

In step S18, the processor 27 determines whether the processor 27 has received a command for changing the radio output level. If the processor 27 has received the command for changing the radio output level (Yes), the processor 27 changes the radio transmission output (step S19), and returns to the process in step S11. If the processor 27 does not receive the command for changing the radio output level (No), the processor 27 returns to the process in step S11.

In the first embodiment, the circulation index value is added to the communication packet indicating the rectified voltage value to be wirelessly transmitted to the power supply device 1 from the power receiving device 2. This circulation index value is the information for indicating the communication sequence. The power receiving device 2 adds a "1" to the circulation index value every time the power receiving device 2 transmits the communication packet. Thus, the power receiving device 2 can show the sequence of the communication packets based on the circulation index value to the power supply device 1.

Figure 5:
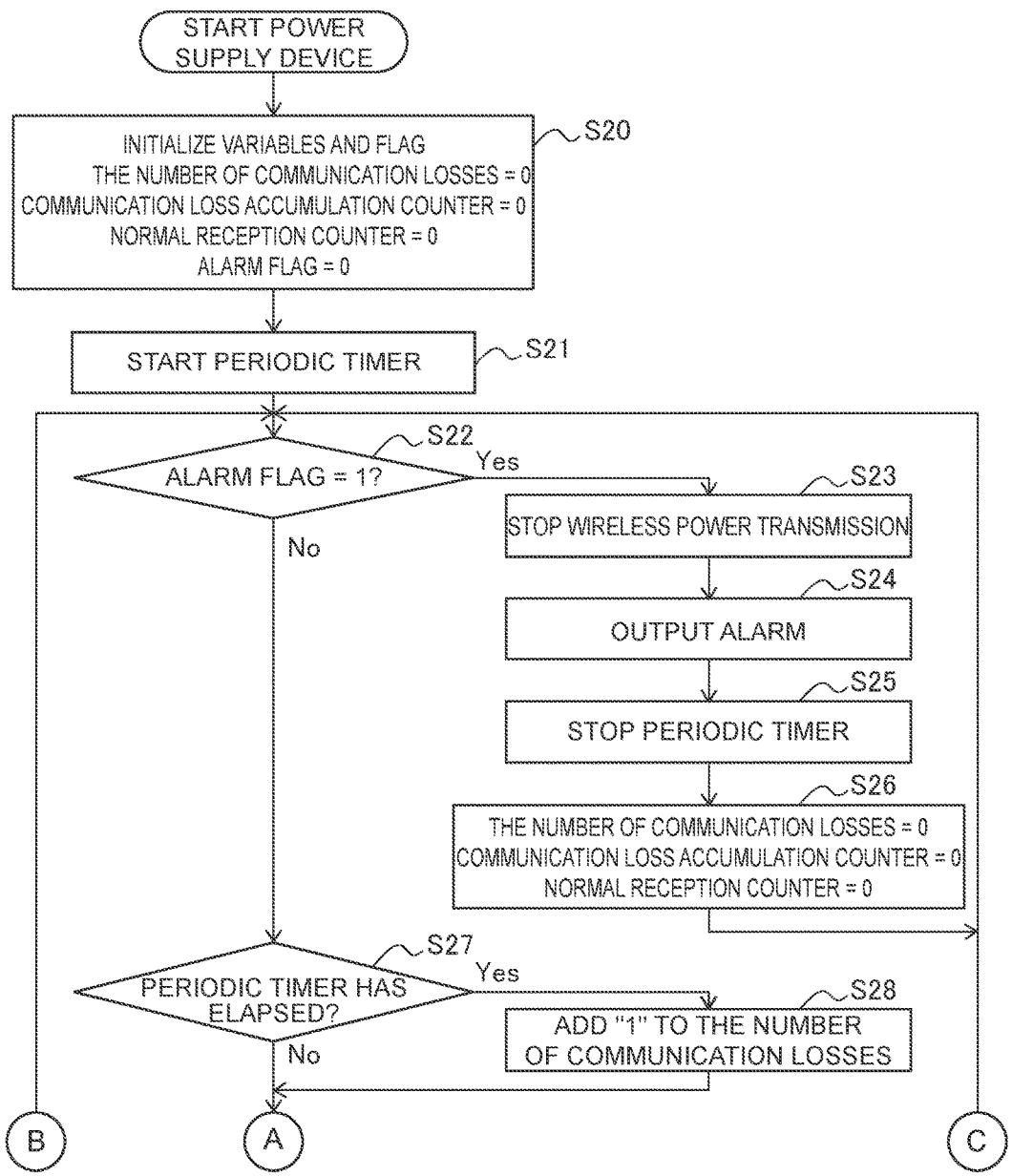
FIG. 5 is a first flowchart illustrating the process of a power supply device in the first embodiment.
Figure 6:
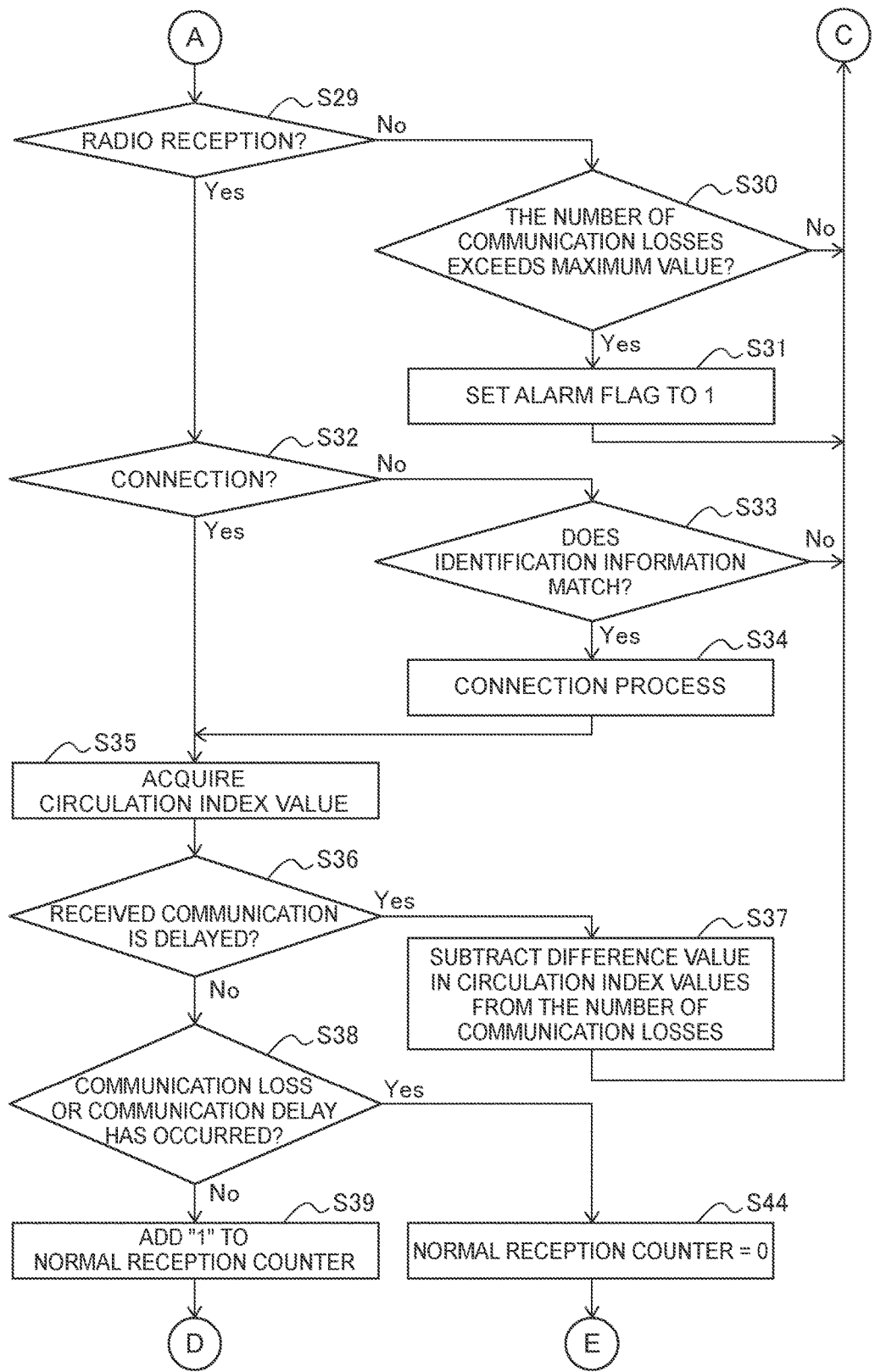
FIG. 6 is a second flowchart illustrating the process of the power supply device in the first embodiment.
Figure 7:
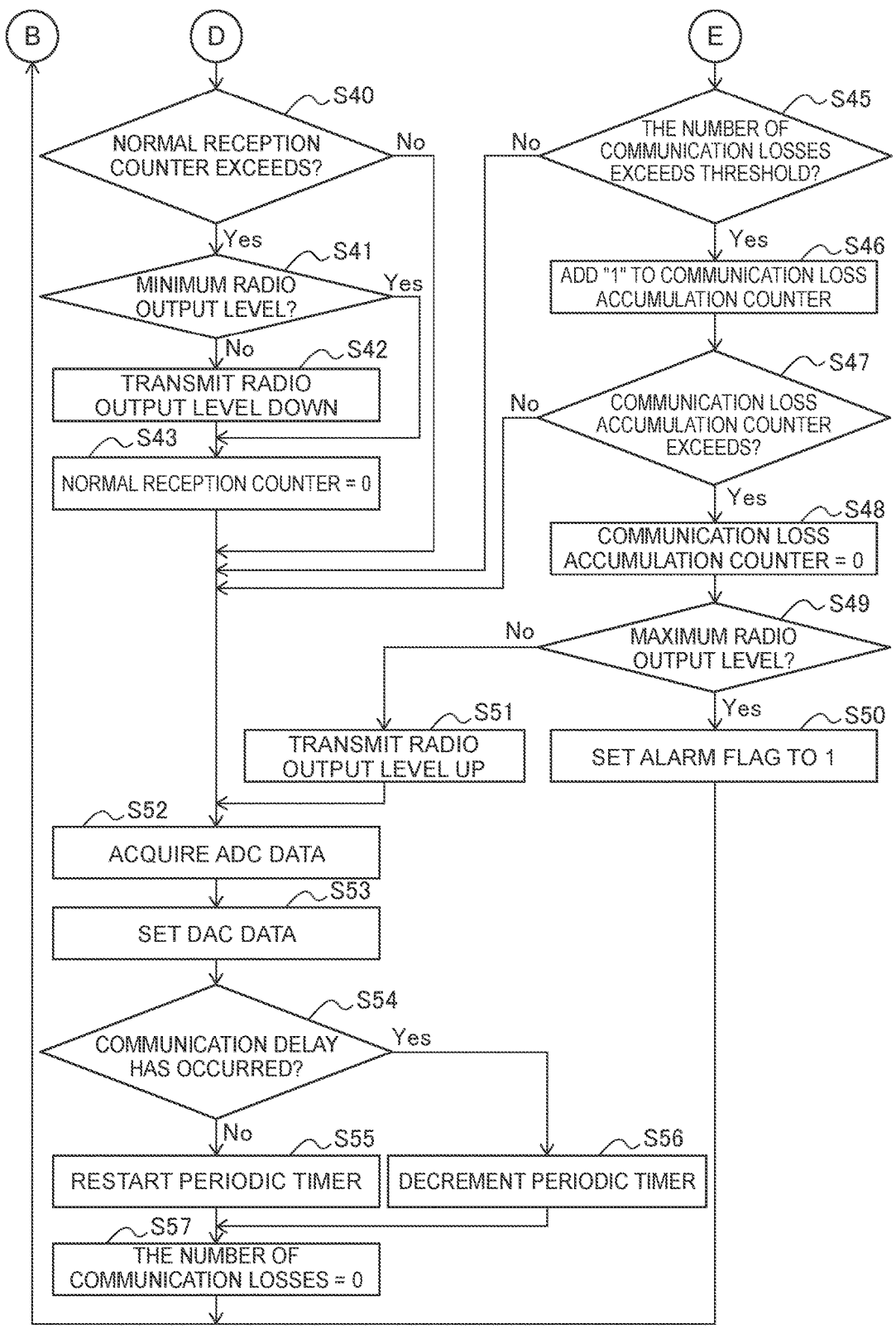
FIG. 7 is a third flowchart illustrating the process of the power supply device in the first embodiment.

FIGS. 5 to 7 are flowcharts each illustrating the process of the power supply device 1. The process illustrated in FIGS. 5 to 7 is started when the processor 17 of the power supply device 1 is started.

The processor 17 initializes variables, flags, and the like (step S20). Specifically, the processor 17 initializes the numbers of communication losses, a communication loss accumulation counter, and a normal reception counter to zero, and clears an alarm flag to zero. Then, the processor 17 starts the periodic timer at a preset value (step S21).

<<Alarm>>

In step S22, the processor 17 determines whether the alarm flag is set to "1." If the alarm flag is set to "1" (Yes), the processor 17 stops the wireless power transmission for the protection operation (step S23), and outputs the alarm to the notification part 10 (step S24). The processor 17 stops the inverter circuit 12, for example, to stop the wireless power transmission.

Furthermore, the processor 17 stops the periodic timer (step S25), and clears variables, flags, and the like (step S26). Specifically, the processor 17 initializes the numbers of communication losses, the communication loss accumulation counter, and the normal reception counter to zero. When the process in step S26 is completed, the processor 17 returns to the process in step S22.

In step S22, if the alarm flag is not set to "1" (No), the processor 17 proceeds to the process in step S27.

<<Counting of the Number of Communication Losses>>

In step S27, the processor 17 determines using the periodic timer whether a communication period of time has elapsed. If the communication period of time has elapsed (Yes), the processor 17 adds a "1" to the number of communication losses (step S28), and then proceeds to the process in step S29 in FIG. 6. Note that it is preferable that the period of time when the processor 17 performs the period elapse determination for a first time after the periodic timer is started and after the periodic timer is restarted (described later) be slightly shorter than the predetermined communication period of 7.5 milliseconds. For example, the first period elapse determination is performed in a 90% period of time of a value obtained by subtracting the reception processing time from the predetermined communication period of time, and the processor 17 adds a "1" to the number of communication losses. In this manner, the processor 17 can receive the communication packet after adding a "1" to the number of communication losses.

If the processor 17 determines that the communication period of time does not elapse in step S27 (No), the processor 17 proceeds to the process in step S29 in FIG. 6.

<<Reception of Communication Packet>>

In step S29 in FIG. 6, the processor 17 determines whether the processor 17 has received the communication packet. If the power supply device 1 is not connected to the power receiving device 2, this communication packet includes the connection request and the identification information from the power receiving device 2. When the processor 17 does not receive the communication packet (No), the processor 17 proceeds to step S30 to determine whether the number of communication losses exceeds the maximum value. If the number of communication losses does not exceed the maximum value in step S30 (No), the processor 17 returns to the process in step S22 in FIG. 5. If the number of communication losses has exceeded the maximum value (e.g., four times) in step S30 (Yes), the processor 17 sets the alarm flag to "1" (step S31), and returns to the process in step S22 in FIG. 5. Note that the maximum value of the number of communication losses may be different depending on whether the power supply device 1 is connected to the power receiving device 2. That is, the processor 17 performs the protection operation if the processor 17 has not received the communication packet from the power receiving device 2 over the predetermined period of time. Thus, the rectified voltage of the power receiving device 2 can be protected from becoming excessive.

If the processor 17 has received the communication packet in step S29 (Yes), the processor 17 proceeds to step S32.

<<Connection>>

In step S32, the processor 17 determines whether the power supply device 1 is connected to the power receiving device 2. If the power supply device 1 is not connected to the power receiving device 2, the processor 17 proceeds to step S33 to determine whether the identification information received from the power receiving device 2 matches with the identification information of the power supply device 1. If the identification information matches in step S33 (Yes), the processor 17 performs the connection process with the power receiving device 2 (step S34), and then proceeds to the process in step S35. Note that in this connection process, the power supply device 1 may reset the periodic timer and the radio output level of the power receiving device 2.

The identification information which can be freely set by a user is set in advance and associated with each of the power supply device 1 and the power receiving device 2. If the identification information firstly received from the power receiving device 2 matches with the identification information of the power supply device 1, the power supply device 1 performs the connection process with the power receiving device 2, thereafter omits the confirmation of the identification information and performs the feedback control. This method enables the power supply device to communicate with the correct power receiving device at a high speed.

Note that since the power receiving device 2 always provides the circulation index value and the A/D conversion data to the communication packet, the power supply device 1 determines the circulation index value immediately after the power supply device 1 is connected to the power receiving device 2. If the identification information of the power receiving device 2 does not match with the identification information of the power supply device 1 in step S33 (No), the processor 17 returns to the process in step S22 in FIG. 5.

If the power supply device 1 is connected to the power receiving device 2 in step S32 (Yes), the processor 17 proceeds to the process in step S35.

<<Determination of Communication Delay of Present Communication Packet>>

In step S35, the processor 17 acquires the circulation index value from the communication packet. Then, the processor 17 calculates a difference between the circulation index values included in the present communication packet and the preceding communication packet to determine whether the communication packet loss occurs between the present communication packet and the preceding communication packet.

In step S36, the processor 17 determines whether the present communication packet is delayed. The processor 17 determines that the present communication packet is delayed if a value obtained by subtracting the difference in circulation index values from the number of communication losses is 1 or more. If the received communication packet is delayed (Yes in step S36), the processor 17 subtracts the difference in circulation index values from the number of communication losses (step S37), and returns to the process in step S22 in FIG. 5.

If the received communication packet is not delayed (No in step S36), the processor 17 proceeds to the process in step S38.

<<Communication Loss or Communication Delay Immediately Before Present Communication Packet>>

In step S38, the processor 17 determines whether the loss or delay of communication packet has occurred immediately before the present communication packet. If the loss or delay of communication packet does not occur immediately before the present communication packet (No), the processor 17 proceeds to the process in step S39. Hereinafter, the processes of steps S39 to S43 are processes to be performed when the present communication packet has been normally received without any loss or delay of communication packet immediately before the present communication packet.

<<Process in Normal Reception>>

In step S39, the processor 17 adds a "1" to a normal reception counter (step S39). The normal reception counter means the number of times the communication packets are normally received in succession. In other words, the processor 17 counts the number of times the communication packets are received over the predetermined period of time.

In step S40 in FIG. 7, the processor 17 determines whether the normal reception counter exceeds a threshold. The threshold of the normal reception counter in the first embodiment is FF (hexadecimal). If the normal reception counter exceeds the threshold (Yes), the processor 17 proceeds to the process in step S41, and if the normal reception counter does not exceed the threshold (No), the processor 17 proceeds to the process in step S52.

In step S41, the processor 17 determines whether the processor 17 instructs the power receiving device 2 to minimize the radio output level (e.g., zero). If the processor 17 does not instruct to minimize the radio output level (No), the processor 17 transmits an instruction to decrease (down) the radio output level (step S42), and proceeds to the process in step S43. When receiving this instruction, the power receiving device 2 decreases the communication output. By this, interference with other radio wave communication apparatuses can be prevented.

If the processor 17 instructs to minimize the radio output level in step S41 (Yes), the processor 17 proceeds to the process in step S43 without changing the radio output level.

In step S43, the processor 17 clears the normal reception counter to zero, and proceeds to the process in step S52.

<<Process in Abnormal Reception>>

Hereinafter, the processes of steps S44 to S51 are performed when a communication packet has not been normally received.

If the loss or delay of communication packet has occurred immediately before the present communication packet in step S38 in FIG. 6 (Yes), the processor 17 clears the normal reception counter to zero (step S44).

In step S45 in FIG. 7, the processor 17 determines whether the number of communication losses exceeds the communication loss threshold. The number of communication losses means the number of cycles elapsed between the communication packet previously received and the communication packet presently received, and a variable indicating how many communication packets have been lost. The communication loss threshold in the first embodiment is 2. If the number of communication losses does not exceed the communication loss threshold (No), the processor 17 proceeds to the process in step S52.

If the number of communication losses exceeds the communication loss threshold in step 45 in FIG. 7 (Yes), the processor 17 adds a "1" to the communication loss accumulation counter (step S46), and proceeds to the process in step S47. The communication loss accumulation counter means a counter variable for counting when the number of communication losses exceeds the predetermined threshold.

If the communication loss accumulation counter exceeds the threshold in step S47 (Yes in step S47), the processor 17 clears this communication loss accumulation counter to zero (step S48). The threshold of the communication loss accumulation counter in the first embodiment is 3. If the processor 17 instructs the power receiving device 2 to maximize the radio output level (e.g., 7) (Yes in step S49), the processor 17 sets the alarm flag to "1" (step S50), and returns to step S22 in FIG. 5. If the processor 17 does not instruct the power receiving device 2 to maximize the radio output level (No in step S49), the processor 17 transmits an instruction to increase (Up) the radio output level (step S51), and proceeds to the process in step S52.

In step S52, the processor 17 acquires A/D conversion data from the communication packet, and sets this A/D conversion data to the D/A converter 172 (step S53). If the wireless power transmission is in an idle state immediately after the power supply device 1 is connected to the power receiving device 2, the transistor Q5 of the initial voltage setting release circuit 15 turns on an error amplifier at proper timing to shift to a feedback state. Note that in the figures, the A/D conversion data is referred to as "ADC data," and the D/A converter 172 is referred to as "DAC."

In step S54, the processor 17 determines whether the communication packet has been delayed immediately before the present communication packet. If the communication packet is not delayed immediately before the present communication packet (No), the processor 17 restarts the periodic timer (step S55). In this manner, the power supply device 1 can be substantially synchronized with the power receiving device 2.

If the communication packet is delayed immediately before the present communication packet (Yes), the processor 17 decrements the periodic timer by a predetermined value (step S56). The predetermined value to decrement the periodic timer is a value obtained by multiplying the period by the difference between the circulation index values of the present communication packet and the preceding communication packet in the normal reception. Then, the processor 17 clears the number of communication losses to zero (step S57), and returns to the process in step S22 in FIG. 5.

Figure 8:
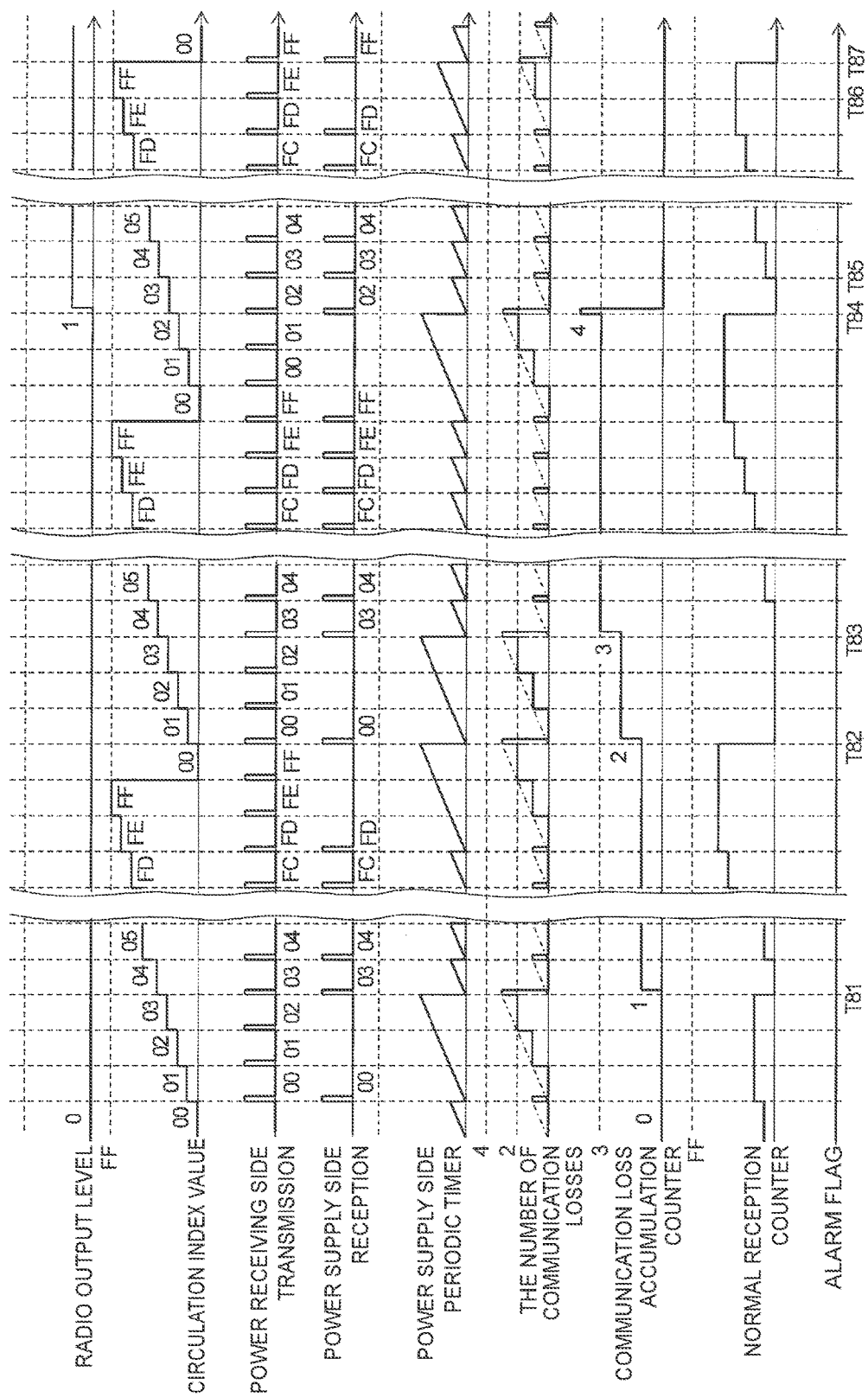
FIG. 8 is a timing chart showing a case where a radio output level is increased due to communication loss in the first embodiment.

FIG. 8 is a timing chart showing a case where the radio output level is increased due to communication loss.

The uppermost chart in FIG. 8 shows a transition of the radio output level in the power receiving device 2 using integer values. The second chart shows the circulation index values in the power receiving device 2. The third chart shows the communication packets transmitted by the power receiving device 2.

The fourth chart shows the communication packets received by the power supply device 1. The fifth chart shows the periodic timer counted by the power supply device 1. The sixth chart shows the number of communication losses counted by the power supply device 1.

Figure 9:
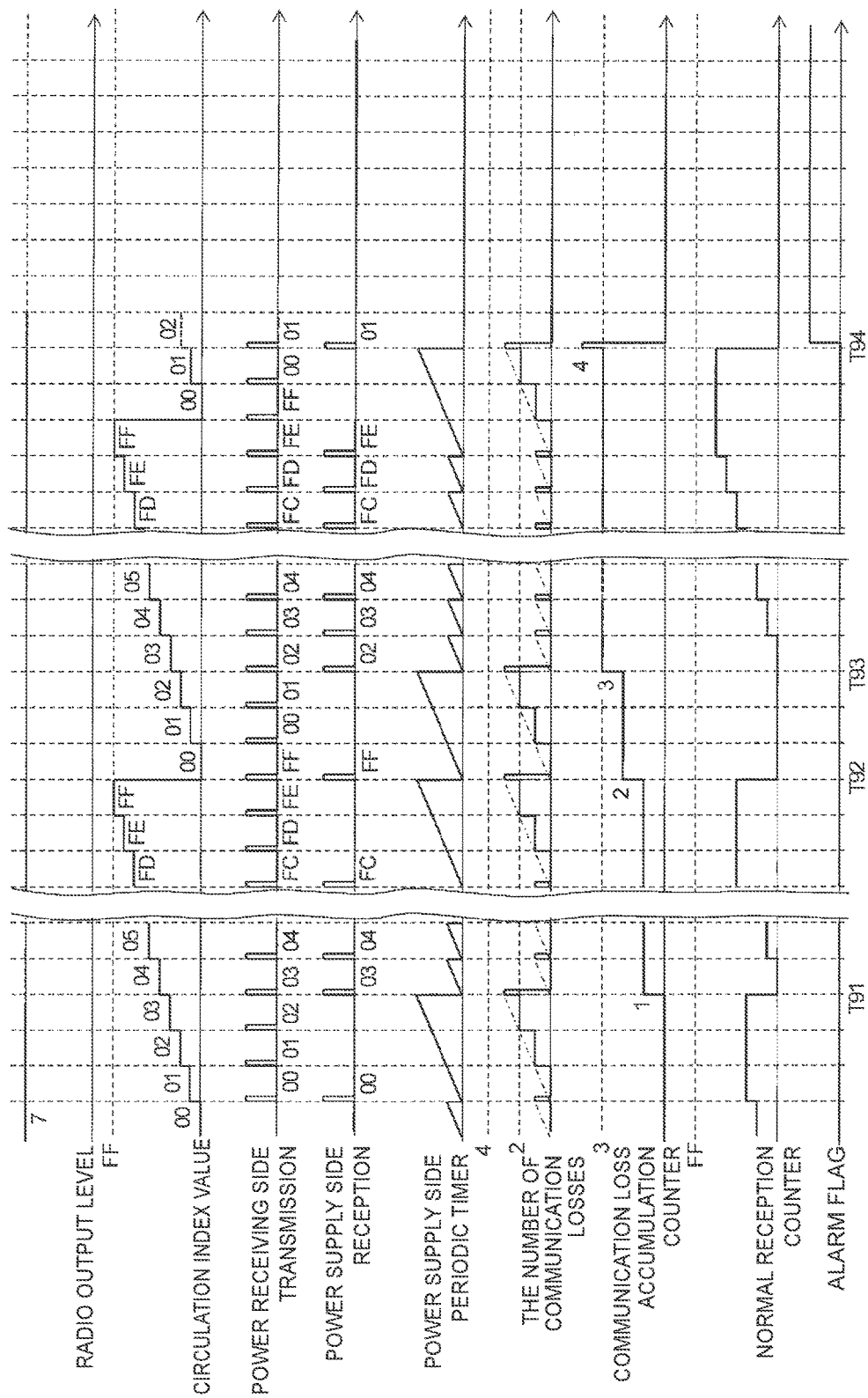
FIG. 9 is a timing chart showing a case where an alarm is generated due to communication packet loss at a maximum radio output level in the first embodiment.
Figure 10:
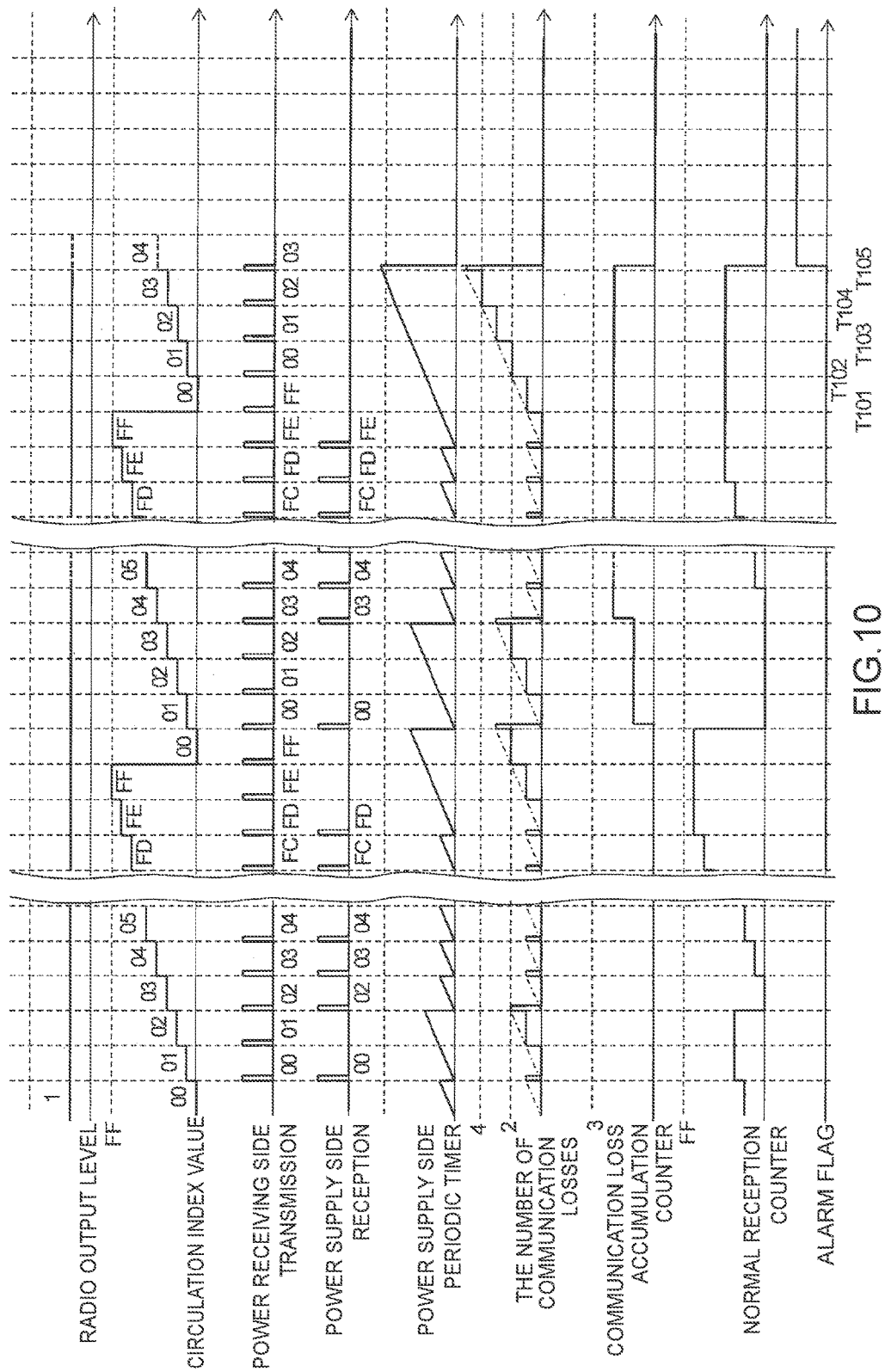
FIG. 10 is a timing chart showing a case where an alarm is generated because the number of communication losses exceeds the maximum value in the first embodiment.
Figure 11:
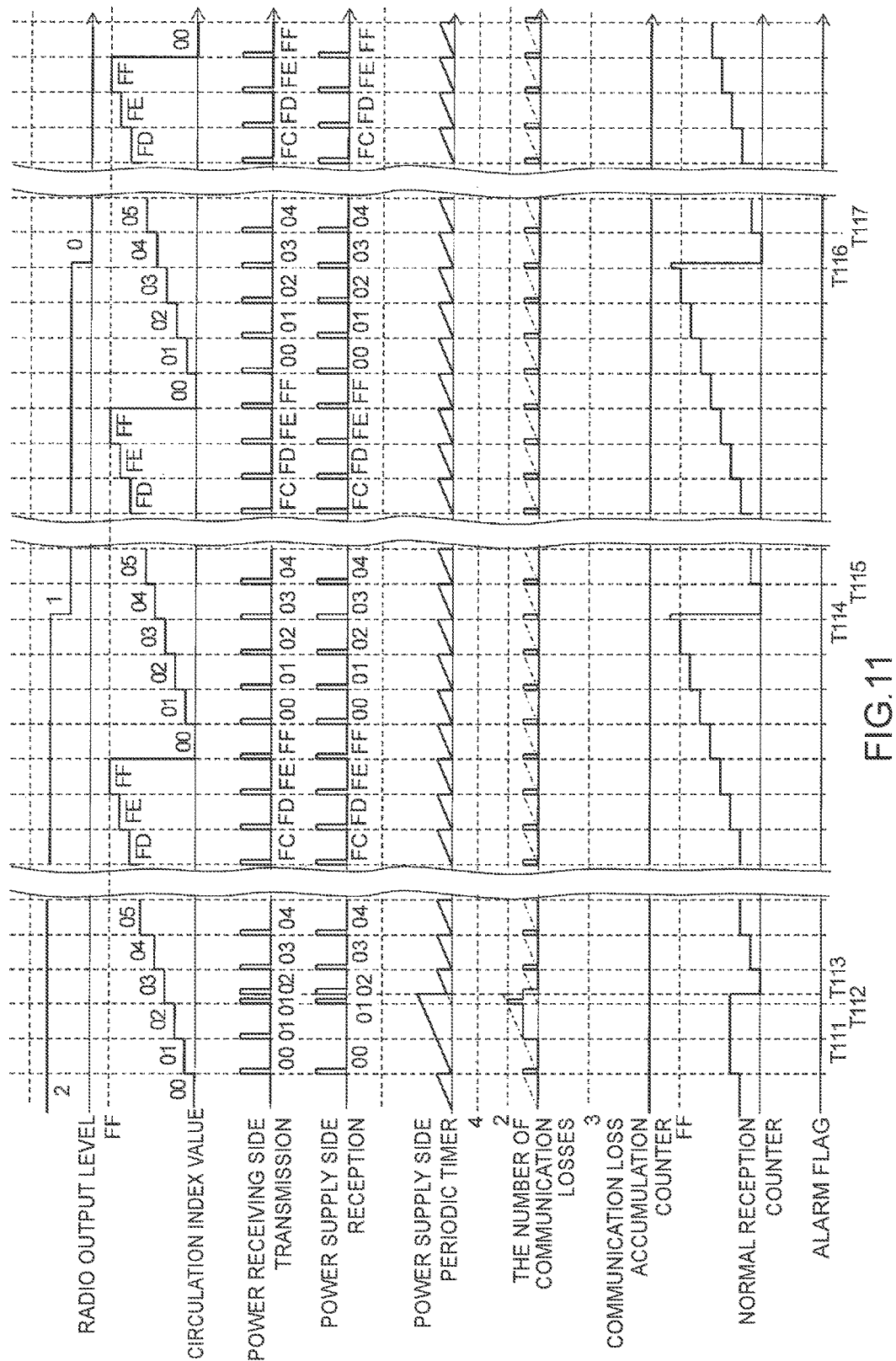
FIG. 11 is a timing chart showing a case where a communication delay has occurred in the first embodiment.

The seventh chart shows the communication loss accumulation counter counted by the power supply device 1. The eighth chart shows the normal reception counter counted by the power supply device 1. The ninth chart shows the alarm flag determined by the power supply device 1. Each of the vertical broken lines common to each chart shows completion timing of the periodic timer of the power receiving device 2. The power receiving device 2 transmits the communication packet and adds a "1" to the circulation index value at each timing indicated by the vertical broken line. Note that each chart in the timing charts in FIGS. 9 to 11 is arranged similarly to FIG. 8.

The power supply device 1 calculates the number of communication losses based on the difference between the circulation index values included in the present communication packet and the preceding communication packet. The communication loss accumulation counter counts the number of times that the number of communication losses exceeded the threshold. If this communication loss accumulation counter exceeds the threshold, the power supply device 1 increases the radio output level of the power receiving device 2. By this method, the low radio output level can be corrected, and the communication packet losses can be minimized.

At a time T81, the radio output level is zero of the minimum value. At the time T81, the processor 17 of the power supply device 1 receives the communication packet including the circulation index value of 03 without a delay. Since the communication packets including the circulation index values of 01, 02 have been lost, the periodic timer on the power supply side counts three periods, and the number of communication losses becomes 3.

At this time, since the determination in step S38 in FIG. 6 is established, the normal reception counter is cleared to zero. Since the determination in step S45 in FIG. 7 is established, the communication loss accumulation counter adds a "1."

In a time T82, the processor 17 of the power supply device 1 receives the communication packet including the circulation index value of 00 without a delay. Since the communication packets including the circulation index values of FE, FF have been lost, the periodic timer on the power supply side counts three periods, and the number of communication losses becomes 3.

At this time, since the determination in step S38 in FIG. 6 is established, the normal reception counter is cleared to zero. Since the determination in step S45 in FIG. 7 is established, the communication loss accumulation counter adds a "1" so that a value of the communication loss accumulation counter becomes 2.

In a time T83, the processor 17 of the power supply device 1 receives the communication packet including the circulation index value of 03 without a delay. Since the communication packets including the circulation index values of 01, 02 have been lost, the periodic timer on the power supply side counts three periods, and the number of communication losses becomes 3.

At this time, since the determination in step S38 in FIG. 6 is established, the normal reception counter is cleared to zero. Since the determination in step S45 in FIG. 7 is established, the communication loss accumulation counter adds a "1" so that the value of the communication loss accumulation counter becomes 3.

In a time T84, the processor 17 of the power supply device 1 receives the communication packet including the circulation index value of 02 without a delay. Since the communication packets including the circulation index values of 00, 01 have been lost, the periodic timer on the power supply side counts three periods, and the number of communication losses becomes 3.

At this time, since the determination in step S38 in FIG. 6 is established, the normal reception counter is cleared to zero. Since the determination in step S45 in FIG. 7 is established, the communication loss accumulation counter adds a "1" so that a value of the communication loss accumulation counter becomes 4, and results in exceeding the threshold of the communication loss accumulation counter. Thus, the communication loss accumulation counter is cleared to zero, and the power supply device 1 transmits, to the power receiving device 2, the instruction to increase the radio output level. The power receiving device 2 increases the radio output level by one step.

At a time T85, the radio output level of the power receiving device 2 is increased by one step to become 1. Hereafter, the power supply device 1 can decrease the probability of losing the communication packet.

At a time T86, the processor 27 of the power receiving device 2 transmits the communication packet including the circulation index value of FE. However, the processor 17 of the power supply device 1 cannot receive the communication packet including the circulation index value of FE, thereby causing the communication packet loss.

At the time T87, the processor 17 of the power supply device 1 receives the communication packet including the circulation index value of FF without a delay. Since the communication packet including the circulation index value of FE has been lost, the periodic timer on the power supply side counts two periods, and the number of communication losses becomes 2.

At this time, since the determination in step S38 in FIG. 6 is established, the normal reception counter is cleared to zero. Since the determination in step S45 in FIG. 7 is not established, the communication loss accumulation counter is not changed.

FIG. 9 is a timing chart showing a case where an alarm is generated due to communication packet loss at the maximum radio output level.

At a time T91, the radio output level of the power receiving device 2 is 7 of the maximum value. At the time T91, the processor 17 of the power supply device 1 receives the communication packet including the circulation index value of 03 without a delay. Since the communication packets including the circulation index values of 01, 02 have been lost, the periodic timer on the power supply side counts three periods, and the number of communication losses becomes 3.

At this time, since the determination in step S38 in FIG. 6 is established, the normal reception counter is cleared to zero. Since the determination in step S45 in FIG. 7 is established, the communication loss accumulation counter adds a "1" so that the value of the communication loss accumulation counter becomes 1.

At a time T92, the processor 17 of the power supply device 1 receives the communication packet including the circulation index value of FF without a delay. Since the communication packets including the circulation index values of FD, FE have been lost, the periodic timer on the power supply side counts three periods, and the number of communication losses becomes 3.

At this time, since the determination in step S38 in FIG. 6 is established, the normal reception counter is cleared to zero. Since the determination in step S45 in FIG. 7 is established, the communication loss accumulation counter adds a "1" so that the value of the communication loss accumulation counter becomes 2.

At a time T93, the processor 17 of the power supply device 1 receives the communication packet including the circulation index value of 02 without a delay. Since the communication packets including the circulation index values of 00, 01 have been lost, the periodic timer on the power supply side counts three periods, and the number of communication losses becomes 3.

At this time, since the determination in step S38 in FIG. 6 is established, the normal reception counter is cleared to zero. Since the determination in step S45 in FIG. 7 is established, the communication loss accumulation counter adds a "1" so that a value of the communication loss accumulation counter becomes 3.

At a time T94, the processor 17 of the power supply device 1 receives the communication packet including the circulation index value of 01 without a delay. Since the communication packets including the circulation index values of FF, 00 have been lost, the periodic timer on the power supply side counts three periods, and the number of communication losses becomes 3.

At this time, since the determination in step S38 in FIG. 6 is established, the normal reception counter is cleared to zero. Since the determination in step S45 in FIG. 7 is established, the communication loss accumulation counter adds a "1" so that a value of the communication loss accumulation counter becomes 4, and results in exceeding the threshold of the communication loss accumulation counter. Thus, since the determination in step S47 in FIG. 7 is established, the communication loss accumulation counter is cleared to zero. At this time, the power supply device 1 already transmits an instruction to maximize the radio output level. Thus, since the determination in step S49 in FIG. 7 is established, the processor 17 sets the alarm flag to "1" (step S50 in FIG. 7). Then, the processor 17 stops the wireless power transmission for the protection operation (step S23 in FIG. 5), and outputs the alarm (step S24 in FIG. 5). The power receiving device 2 stops the operation.

FIG. 10 is a timing chart showing a case where an alarm is generated because the number of communication losses exceeds the maximum value.

At a time T101, the processor 27 of the power receiving device 2 transmits the communication packet including the circulation index value of FF. However, the processor 17 of the power supply device 1 cannot receive this communication packet, thereby causing the communication packet loss. Thus, the number of communication losses becomes 1.

At a time T102, the processor 27 of the power receiving device 2 transmits the communication packet including the circulation index value of 00. However, the processor 17 of the power supply device 1 cannot receive this communication packet, thereby causing the communication packet loss. The communication packets for two periods are not received by the power supply device 1. Thus, the number of communication losses becomes 2.

At a time T103, the processor 27 of the power receiving device 2 transmits the communication packet including the circulation index value of 01. However, the processor 17 of the power supply device 1 cannot receive this communication packet, thereby causing the communication packet loss. The communication packets for three periods are not received by the power supply device 1. Thus, the number of communication losses becomes 3.

At a time T104, the processor 27 of the power receiving device 2 transmits the communication packet including the circulation index value of 02. However, the processor 17 of the power supply device 1 cannot receive this communication packet, thereby causing the communication packet loss. The communication packets for four periods are not received by the power supply device 1. Thus, the number of communication losses becomes 4.

At a time T105, the processor 27 of the power receiving device 2 transmits the communication packet including the circulation index value of 03. However, the processor 17 of the power supply device 1 cannot receive this communication packet, thereby causing the communication packet loss. The communication packets for five periods are not received by the power supply device 1. Then, the number of communication losses becomes 5, and results in exceeding 4 being the maximum number of communication losses. Thus, since the determination in step S30 in FIG. 6 is established, the processor 17 sets the alarm flag to "1" (step S31 in FIG. 6). Then, the processor 17 stops the wireless power transmission for the protection operation (step S23 in FIG. 5), and outputs the alarm (step S24 in FIG. 5). The power receiving device 2 stops the operation.

FIG. 11 is a timing chart showing a case where the communication delay has occurred and a case where the radio output level has been decreased.

At a time T111, the radio output level of the power receiving device 2 is 2. At the time T111, the processor 27 of the power receiving device 2 transmits the communication packet including the circulation index value of 01. However, the processor 17 of the power supply device 1 cannot receive this communication packet. At a time T112, the power receiving device 2 retransmits the communication packet including the circulation index value of 01 to recover the communication packet loss. The processor 17 of the power supply device 1 receives this communication packet at the time T112. Since the number of communication losses is 2 and the difference in circulation index values is 1, the processor 17 determines that the communication packet has been lost (delayed) in step S36 in FIG. 6. The processor 17 subtracts the difference in circulation index values from the number of communication losses in step S37 in FIG. 6, returns to step S22 in FIG. 5, and ignores the A/D conversion data included in this communication packet. The difference in circulation index values is a difference between circulation index values included in the present communication packet and the preceding communication packet, here the difference in circulation index values is 1.

At a time T113, the processor 27 of the power receiving device 2 transmits the communication packet including the circulation index value of 02. The processor 17 of the power supply device 1 receives this communication packet at the time T113 slightly delayed from the time T112 when this communication packet is supposed to be received. At this time, since the number of communication losses is 1 and the difference in circulation index values is 1, the processor 17 determines in step S36 in FIG. 6 that the received communication packet is not lost (delayed). Since the preceding communication packet (communication packet at the time T112) is delayed, the determination in step S38 in FIG. 6 is established, and the normal reception counter is cleared to zero.

At the time T113, since the preceding communication packet has been delayed, the determination in step S54 in FIG. 7 is established, and the processor 17 decrements the periodic timer on the power supply side by a value for two periods. Thus, the value of the periodic timer is substantially the same as a value when the periodic time is restarted at the time T112, and the time from a start of the period (time from T112 to T113) can be cancelled.

The power supply device 1 calculates the number of communication losses (losses and delays) based on the difference between the circulation index values included in the present communication packet and the preceding communication packet. In the power supply device 1, the normal reception counter counts the number of communication packets received without losing the communication packets. If the normal reception counter exceeds the threshold, the power supply device 1 instructs the power receiving device 2 to decrease the radio output level. When receiving this instruction, the power receiving device 2 decreases the radio output level. By this, interference with other radio wave communication apparatuses can be prevented.

At the time T114, the processor 27 of the power receiving device 2 transmits the communication packet including the circulation index value of 03. The processor 17 of the power supply device 1 receives this communication packet. At this time, since the number of communication losses is 1 and the difference in circulation index values is 1, the processor 17 determines in step S36 in FIG. 6 that the received communication packet is not delayed. Since the preceding communication packet is not lost, the normal reception counter increases from FF (hexadecimal) to 00 (hexadecimal). Thus, the processor 17 of the power supply device 1 transmits an instruction to decrease (down) the radio output level to the power receiving device 2. When receiving this instruction, the radio output level of the power receiving device 2 becomes 1 to be decreased by one step. By this, interference with other radio wave communication apparatuses can be prevented.

At a time T115, the processor 27 of the power receiving device 2 transmits the communication packet including the circulation index value of 04 in a state where the radio output level is decreased. The processor 17 of the power supply device 1 receives this communication packet.

At a time T116, the processor 27 of the power receiving device 2 transmits the communication packet including the circulation index value of 03. The processor 17 of the power supply device 1 receives this communication packet. At this time, since the number of communication losses is 1 and the difference in circulation index values is 1, the processor 17 determines in step S36 in FIG. 6 that the communication packet is not delayed, and determines in step S38 in FIG. 6 that the communication loss does not occur. Since the preceding communication packet is not lost, the normal reception counter increases from FF (hexadecimal) to 00 (hexadecimal). Thus, the processor 17 of the power supply device 1 transmits an instruction to decrease (down) the radio output level to the power receiving device 2. When receiving this instruction, the radio output level of the power receiving device 2 becomes zero of the minimum value to be decreased by one step. By this, interference with other radio wave communication apparatuses can be prevented.

At a time T117, the processor 27 of the power receiving device 2 transmits the communication packet including the circulation index value of 04 in a state where the radio output level is decreased to zero of the minimum value. The processor 17 of the power supply device 1 receives this communication packet. Hereafter, the power supply device 1 does not transmit to the power receiving device 2 the instruction to decrease the radio output level because step S41 in FIG. 7 is established even if the normal reception counter exceeds the threshold.

Figure 12:
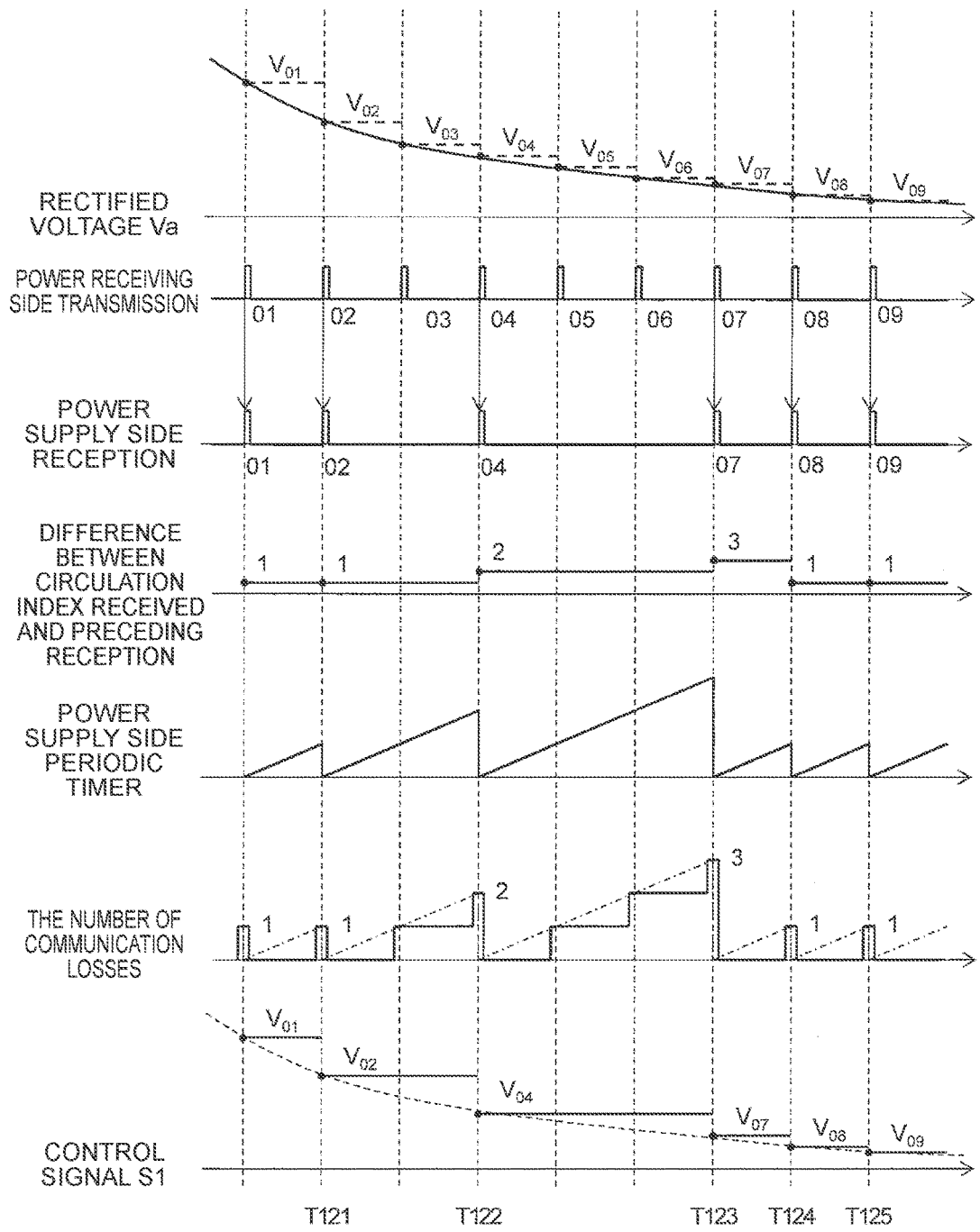
FIG. 12 is a timing chart showing a relationship among a rectified voltage, a control signal and the like when the communication loss has occurred in the first embodiment.

FIG. 12 is a timing chart showing a relationship among the rectified voltage Va, the control signal S1, and the like when the communication loss has occurred. In a communication method having no reliability of communication instead of having the real-time property such as sound, the communication loss due to the communication packet loss may occur as shown in FIG. 12.

In the uppermost chart in FIG. 12, the rectified voltage Va in the power receiving device 2 is indicated by a solid line, and the A/D conversion data is indicated by a broken line. The second chart shows communication packets transmitted by the power receiving device 2, and the circulation index values are indicated below the communication packets, respectively.

The third chart shows communication packets received by the power supply device 1, and the circulation index values are indicated below the communication packets, respectively. The fourth chart shows a difference between circulation index values included in the present communication packet and the preceding communication packet received by the power supply device 1. The fifth chart shows a periodic timer counted by the power supply device 1.

Figure 13:
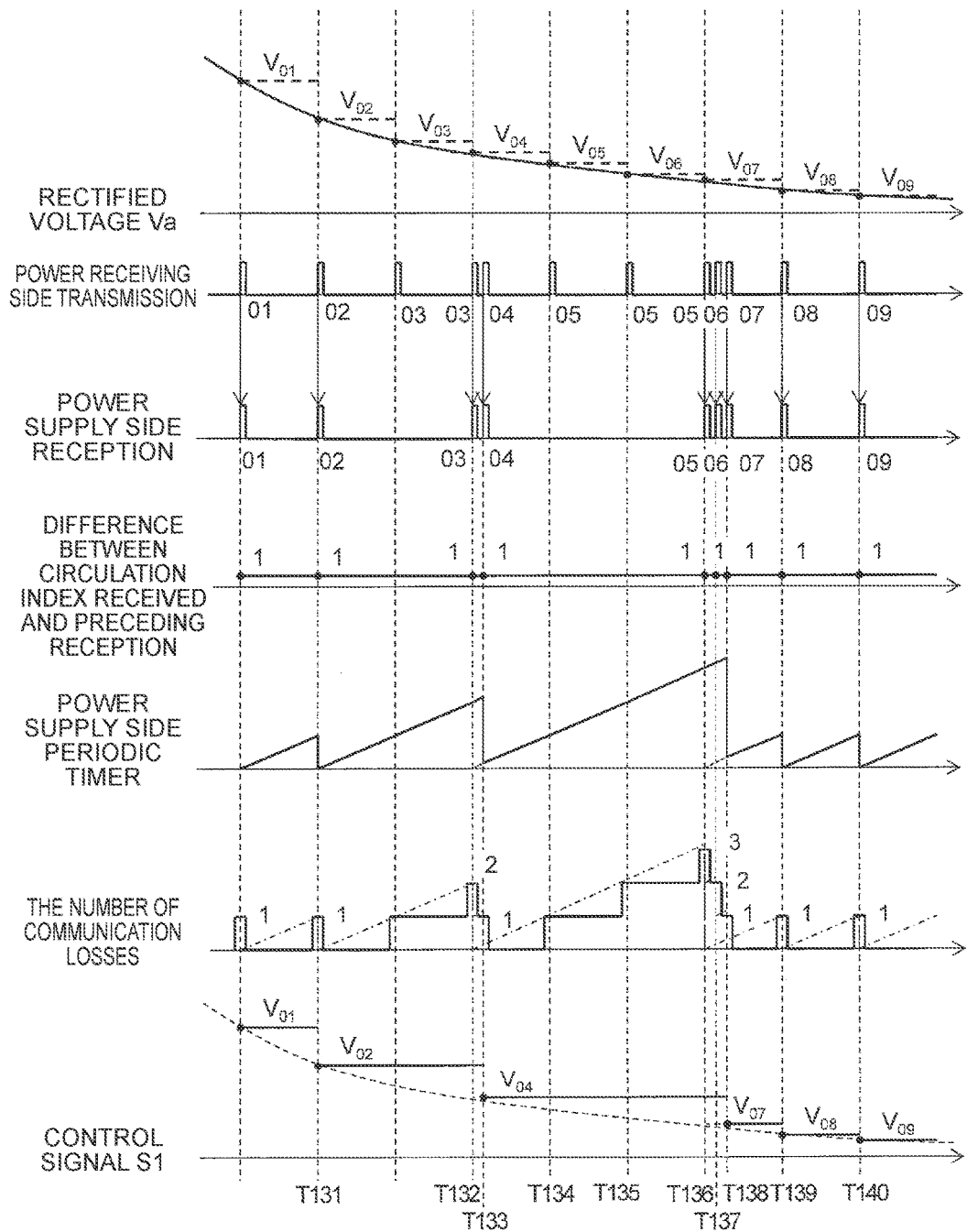
FIG. 13 is a timing chart showing a relationship among the rectified voltage, the control signal and the like when the communication delay has occurred in the first embodiment.

The sixth chart shows the number of communication losses counted by the power supply device 1. In the seventh chart, the control signal S1 feedback by the power supply device 1 is indicated by a solid line, and the rectified voltage Va is indicated by a broken line. Each of the vertical broken lines common to each chart shows completion timing of the periodic timer of the power receiving device 2. The power receiving device 2 transmits the communication packet and adds a "1" to the circulation index value at each timing indicated by the vertical broken line. Note that each chart in a timing chart in FIG. 13 is arranged similarly to FIG. 12.

Note that at a time T121 in FIG. 12, the power supply device 1 normally receives the communication packet. Thus, at the time T121, the difference between the circulation index values included in the present communication packet and the preceding communication packet received by the power supply device 1 is 1.

At the time T121, the A/D conversion data of the rectified voltage Va is a voltage $V_{02}$. The power receiving device 2 creates transmission data based on the voltage $V_{02}$ and the circulation index value of 02, and transmits the transmission data as a communication packet. The processor 17 of the power supply device 1 receives this communication packet within a predetermined delay time. At this time, the number of communication losses is 1, and the difference between the circulation index values included in the present communication packet and the preceding communication packet is 1. Since the difference in circulation index values is subtracted from the number of communication losses to result in zero, the processor 17 determines that the power supply device 1 has received this communication packet within the predetermined delay time, and outputs the A/D conversion data to the D/A converter 172. Thus, the voltage $V_{02}$ is feedback to the control signal S1. Furthermore, the processor 17 restarts the periodic timer, and clears the number of communication losses to zero. Note that the delay time is a time obtained by excluding a reception processing time immediately before the periodic timer on the power supply side is restarted from a time for one period of the communication period of time for receiving the communication packet by the power supply device 1 without communication packet loss.

The communication packets for two periods are not received by the power supply device 1 during a period of time from the time T121 and a time T122. At the time T122, the periodic timer on the power supply side counts two periods, and the processor 17 sets the number of communication losses to 2. Note that a period of time required when the processor 17 increases the number of communication losses from zero to 1 is slightly shorter than a period of time required when the processor 17 increases the number of communication losses from 1 to 2. At this time, the power supply device 1 loses the communication packet for one period.

At the time T122, the A/D conversion data of the rectified voltage Va is a voltage $V_{04}$. The power receiving device 2 creates transmission data based on the voltage $V_{04}$ and the circulation index value of 04, and transmits the transmission data as a communication packet. The processor 17 of the power supply device 1 receives this communication packet within a predetermined delay time. At this time, the number of communication losses is 2, and the difference between the circulation index values included in the present communication packet and the preceding communication packet is 2. Since the difference in circulation index values is subtracted from the number of communication losses to result in zero, the processor 17 determines that the communication packet for one period is lost until the present communication packet is received, resulting in loss of the communication packet, but the power supply device 1 has received this communication packet within the predetermined delay time, and the processor 17 outputs the A/D conversion data to the D/A converter 172. Thus, the voltage $V_{04}$ is feedback to the control signal S1. Furthermore, the processor 17 restarts the periodic timer, and clears the number of communication losses to zero.

The communication packets for three periods are not received by the power supply device 1 during a period of time from the time T122 and a time T123. At the time T123, the periodic timer on the power supply side counts three periods, and the processor 17 sets the number of communication losses to 3. At this time, the power supply device 1 loses the communication packets for two periods.

At the time T123, the A/D conversion data of the rectified voltage Va is a voltage $V_{07}$. The power receiving device 2 creates transmission data based on the voltage $V_{07}$ and the circulation index value of 07, and transmits the transmission data as a communication packet. The processor 17 of the power supply device 1 receives this communication packet within a predetermined delay time. At this time, the number of communication losses is 3, and the difference between the circulation index values included in the present communication packet and the preceding communication packet is 3. Since the difference in circulation index values is subtracted from the number of communication losses to result in zero, the processor 17 determines that the communication packets for two periods are lost until the present communication packet is received, resulting in losing the communication packets, but the power supply device 1 has received this communication packet within the predetermined delay time, and the processor 17 outputs the A/D conversion data to the D/A converter 172. Thus, the voltage $V_{07}$ is feedback to the control signal S1. Furthermore, the processor 17 restarts the periodic timer, and clears the number of communication losses to zero.

At a time T124, the A/D conversion data of the rectified voltage Va is a voltage $V_{08}$. The power receiving device 2 creates transmission data based on the voltage $V_{08}$ and the circulation index value of 08, and transmits the transmission data as a communication packet. The processor 17 of the power supply device 1 receives this communication packet within a predetermined delay time. At this time, the number of communication losses is 1, and the difference between the circulation index values included in the present communication packet and the preceding communication packet is 1. Since the difference in circulation index values is subtracted from the number of communication losses to result in zero, the processor 17 determines that the power supply device 1 has received this communication packet within the predetermined delay time, and outputs the A/D conversion data to the D/A converter 172. Thus, the voltage $V_{08}$ is feedback to the control signal S1. Furthermore, the processor 17 restarts the periodic timer, and clears the number of communication losses to zero.

At a time T125, the A/D conversion data of the rectified voltage Va is a voltage $V_{09}$. The power receiving device 2 creates transmission data based on the voltage $V_{09}$ and the circulation index value of 09, and transmits the transmission data as a communication packet. The processor 17 of the power supply device 1 receives this communication packet within a predetermined delay time. At this time, the number of communication losses is 1, and the difference between the circulation index values included in the present communication packet and the preceding communication packet is 1. Since the difference in circulation index values is subtracted from the number of communication losses to result in zero, the processor 17 determines that the power supply device 1 has received this communication packet within the predetermined delay time, and outputs the A/D conversion data to the D/A converter 172. Thus, the voltage $V_{09}$ is feedback to the control signal S1. Furthermore, the processor 17 restarts the periodic timer, and clears the number of communication losses to zero.

FIG. 13 is a timing chart showing a relationship among the rectified voltage Va, the control signal S1, and the like when the communication delay has occurred. As illustrated in FIG. 13, when using communication means having reliability in communication, a communication delay to recover a communication packet loss may occur after the communication packet is lost. Note that the protection operation is performed if the number of communication losses exceeds the maximum value.

Note that at a time T131 in FIG. 13, the power supply device 1 normally receives the communication packet. Thus, at the time T131, the difference between the circulation index values included in the present communication packet and the preceding communication packet received by the power supply device 1 is 1.

At a time T131, the A/D conversion data of the rectified voltage Va is a voltage $V_{02}$. The power receiving device 2 creates transmission data based on the voltage $V_{02}$ and the circulation index value of 02, and transmits the transmission data as a communication packet. The processor 17 of the power supply device 1 receives this communication packet within a predetermined delay time. At this time, the number of communication losses is 1, and the difference between the circulation index values included in the present communication packet and the preceding communication packet is 1. Since the difference in circulation index values is subtracted from the number of communication losses to result in zero, the processor 17 determines that the power supply device 1 has received this communication packet within the predetermined delay time, and outputs the A/D conversion data to the D/A converter 172. Thus, the voltage $V_{02}$ is feedback to the control signal S1. Furthermore, the processor 17 restarts the periodic timer, and clears the number of communication losses to zero.

The communication packets for two periods are not received by the power supply device 1 during a period of time from the time T131 and a time T132. At the time T132, the periodic timer on the power supply side counts two periods, and the processor 17 sets the number of communication losses to 2. At this time, the power supply device 1 loses the communication packet for one period.

At the time T132, the power receiving device 2 for recovering the communication packet losses retransmits the communication packet including the circulation index value of 03. The processor 17 of the power supply device 1 receives the communication packet including the circulation index value of 03 later than the time when this communication packet is supposed to be received. At this time, the number of communication losses is 2, and the difference between circulation index values included in the present communication packet and the preceding communication packet is 1. Since the difference in circulation index values is subtracted from the number of communication losses to result in 1, the processor 17 determines that the communication packet loss for one period has occurred until this communication packet is received, and the communication packet has been delayed, and the processor 17 ignores the voltage $V_{03}$ included in this communication packet.

At a time T133, the processor 17 of the power supply device 1 receives the communication packet including the circulation index value of 04 slightly later than the time T132 when this communication packet is supposed to be received. At this time, the number of communication losses is 1 and the difference between circulation index values included in the present communication packet and the preceding communication packet is 1. Since the difference in circulation index values is subtracted from the number of communication losses to result in zero, the processor 17 determines that this communication packet is not delayed. The processor 17 acquires a voltage $V_{04}$ included in this communication packet, and outputs the voltage $V_{04}$ to the D/A converter 172. Thus, the voltage $V_{04}$ is feedback to the control signal S1. Furthermore, the processor 17 sets the period of the periodic timer to a slightly shorter period, and clears the number of communication losses to zero.

At a time T134, the processor 27 of the power receiving device 2 transmits the communication packet including the circulation index value of 05. The processor 17 of the power supply device 1 cannot receive this communication packet.

At a time T135, the processor 27 of the power receiving device 2 retransmits the communication packet including the circulation index value of 05. The processor 17 of the power supply device 1 cannot receive this communication packet. The processor 27 does not transmit a communication packet including the circulation index value of 06 because the processor 27 cannot confirm that the communication packet including the circulation index value of 05 has been received.

The communication packets for three periods are not received by the power supply device 1 during a period of time from the time T133 and a time T136. At the time T136, the periodic timer on the power supply side counts three periods, and the processor 17 sets the number of communication losses to 3. At this time, the power supply device 1 loses the communication packets for two periods.

At the time T136, the power receiving device 2 for recovering the communication packet losses retransmits the communication packet including the circulation index value of 05. The processor 17 of the power supply device 1 receives the communication packet including the circulation index value of 05 later than the time T134 when the communication packet including the circulation index value of 05 is supposed to be received. At this time, the number of communication losses is 3, and the difference between circulation index values included in the present communication packet and the preceding communication packet is 1. Thus, the processor 17 determines that the communication packet losses for two periods have occurred until this communication packet is received, and the communication packet has been delayed, and the processor 17 ignores the voltage $V_{05}$ included in this communication packet.

At a time T137, the power receiving device 2 transmits the communication packet including the circulation index value of 06. The processor 17 of the power supply device 1 receives the communication packet including the circulation index value of 06 later than the time T135 when the communication packet including the circulation index value of 06 is supposed to be received. At this time, the number of communication losses is 2, and the difference between circulation index values included in the present communication packet and the preceding communication packet is 1. Thus, the processor 17 determines that the communication packet loss for one period has occurred until this communication packet is received, and the communication packet has been delayed, and the processor 17 ignores the voltage $V_{06}$ included in this communication packet.

At a time T138, the power receiving device 2 transmits the communication packet including the circulation index value of 07. The processor 17 of the power supply device 1 receives the communication packet including the circulation index value of 07 slightly later than the time T136 when this communication packet is supposed to be received. At this time, the number of communication losses is 1 and the difference between circulation index values included in the present communication packet and the preceding communication packet is 1. Thus, the processor 17 determines that this communication packet has been received within the predetermined delay time, in other words, this communication packet has been received without a delay. The processor 17 acquires a voltage $V_{07}$ included in this communication packet, and outputs the voltage $V_{07}$ to the D/A converter 172. Thus, the voltage $V_{07}$ is feedback to the control signal S1. Furthermore, the processor 17 subtracts the count value for three periods from the period of the periodic timer, and clears the number of communication losses to zero.

At a time T139, the processor 17 of the power supply device 1 receives the communication packet including the circulation index value of 08. At this time, the number of communication losses is 1 and the difference between circulation index values included in the present communication packet and the preceding communication packet is 1. Thus, the processor 17 determines that this communication packet has been received within the predetermined delay time, in other words, this communication packet has been received without a delay. The processor 17 acquires a voltage $V_{08}$ included in this communication packet, and outputs the voltage $V_{08}$ to the D/A converter 172. Thus, the voltage $V_{08}$ is feedback to the control signal S1. Furthermore, the processor 17 restarts the periodic timer, and clears the number of communication losses to zero.

At a time T140, the processor 17 of the power supply device 1 receives the communication packet including the circulation index value of 09. At this time, the number of communication losses is 1 and the difference between circulation index values included in the present communication packet and the preceding communication packet is 1. Thus, the processor 17 determines that this communication packet has been received within the predetermined delay time, in other words, this communication packet has been received without a delay. The processor 17 acquires a voltage $V_{09}$ included in this communication packet, and outputs the voltage $V_{09}$ to the D/A converter 172. Thus, the voltage $V_{09}$ is feedback to the control signal S1. Furthermore, the processor 17 restarts the periodic timer, and clears the number of communication losses to zero.

(Modifications)

The present disclosure is not limited to the above-described first embodiment, and can be modified and implemented within a scope not deviating from the gist of the disclosure, as described in (a) to (i) below, for example.

(a) In the power receiving device 2, the DC/DC converter 23 is not indispensable, and the load 29 may be directly connected.

(b) The component to be controlled by the upper device of the power supply device 1 is not limited to the DC/DC converter 23, and, for example, the load 29 may be directly controlled.

(c) The radio communication protocol between the power supply device 1 and the power receiving device 2 is not limited to Bluetooth (registered trademark) Low Energy, and may be Wi-Fi (registered trademark) and ZIGBEE (registered trademark).

(d) The radio communication between the power supply device 1 and the power receiving device 2 is not limited to the radio wave communication, and may be radio communication such as infrared communication, visible light communication, and ultrasonic communication, if a proper radio communication path can be established.

(e) The feedback control is not limited to the proportional control (classic control) shown in the above-described first embodiment, and may be the classic control such as PI control and PID control or the modern control.

(f) The integration process may be performed by a digital signal processor instead of the integration circuit included in the control circuit 11.

(g) The protection operation is not limited to stopping the inverter circuit 12 of the power supply device 1, the transistor Q5 of the initial voltage setting release circuit 15 may be turned off to shift the wireless power transmission to an idling state.

(h) In step S23 in FIG. 5, the power supply device 1 may wirelessly transmit the alarm information to the power receiving device 2 before the power supply device 1 stops the wireless power transmission, and the power receiving device 2 may turn off the DC/DC converter 23, and output the alarm to the upper system of the power receiving device 2 from the input/output circuit 271.

(i) The circulation index value transition is not limited to adding a "1" of a predetermined value in every update and returning the circulation index value to zero (minimum value) when adding a "1" at FF (maximum value), and the circulation index value may be returned to FF (maximum value) by adding "−1" at zero (minimum value). In other words, the processor 27 may subtract a "1" of the predetermined value from the circulation index value every time the communication packet is transmitted to the power supply device 1, and the circulation index value may be returned to FF of the maximum value within a predetermined range from 00 to FF (hexadecimal) if the circulation index value is below 00 of the minimum value within the predetermined range. The circulation index value is not limited to 8 bits.

Second Embodiment

FIGS. 1 and 2 described in the first embodiment are similarly applied to a second embodiment, and the descriptions of FIGS. 1 and 2 are omitted.

Figure 14:
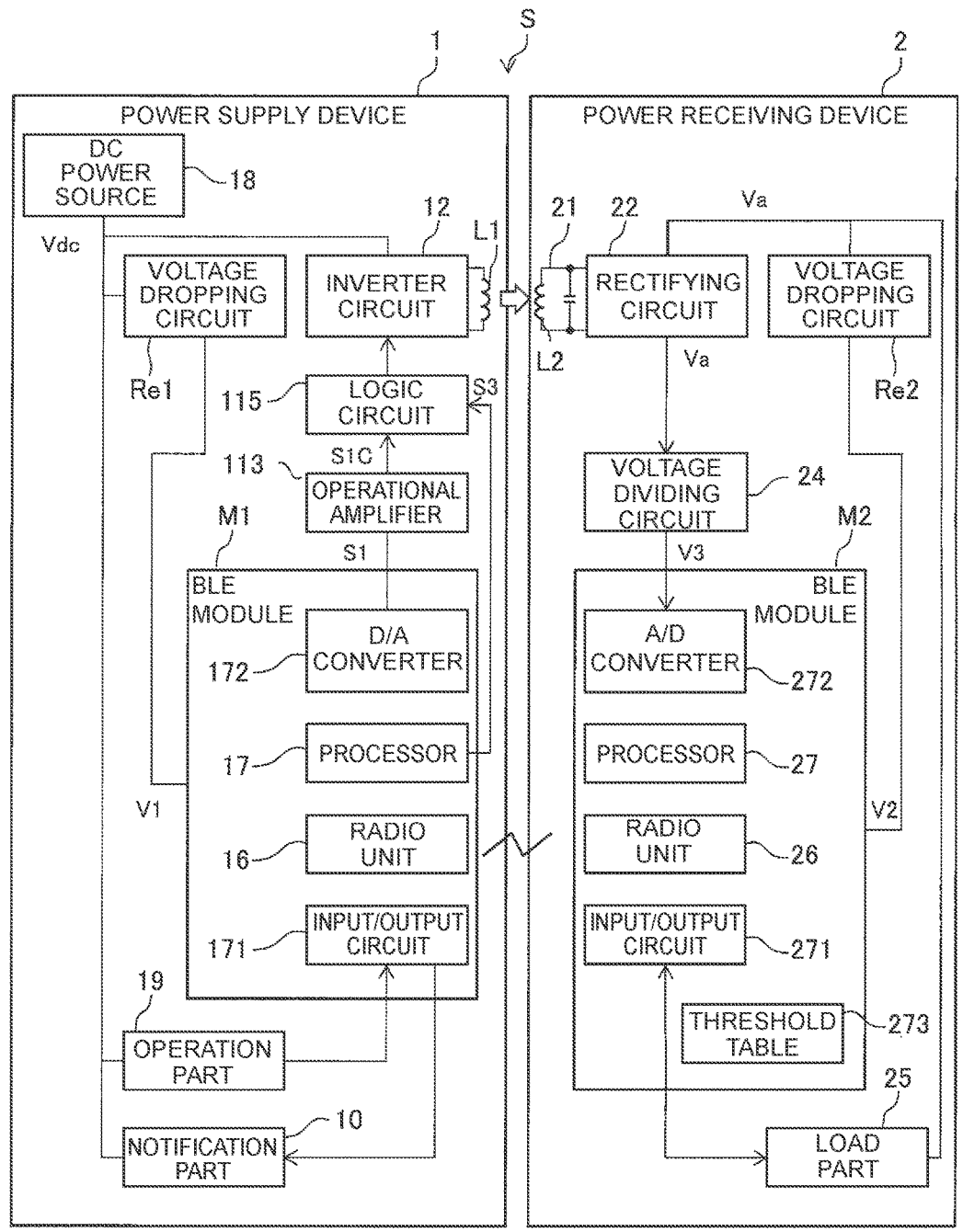
FIG. 14 is a block diagram illustrating a wireless power transmission system in a second embodiment.

FIG. 14 is a block diagram illustrating a wireless power transmission system S.

FIG. 14 is similar to FIG. 3 except that a radio module M2 is further provided with a threshold table 273.

The threshold table 273 is a table stored in, for example, EEPROM (Electrically Erasable Programmable Read Only Memory). The threshold table 273 stores the correspondence among operation information and change in power receiving side, information indicating whether the fluctuation in load occurs, and a threshold of the fluctuation counter when the load fluctuates. Here, the load fluctuation means that the rectified voltage fluctuates as the load 29 is driven.

The processor 17 of the power supply device 1 stops the inverter circuit 12 for the protection operation and outputs the alarm to the notification part 10 when the rectified voltage value is out of the predetermined voltage range (e.g. 12 V±10%) for a predetermined period of time.

Figure 15:
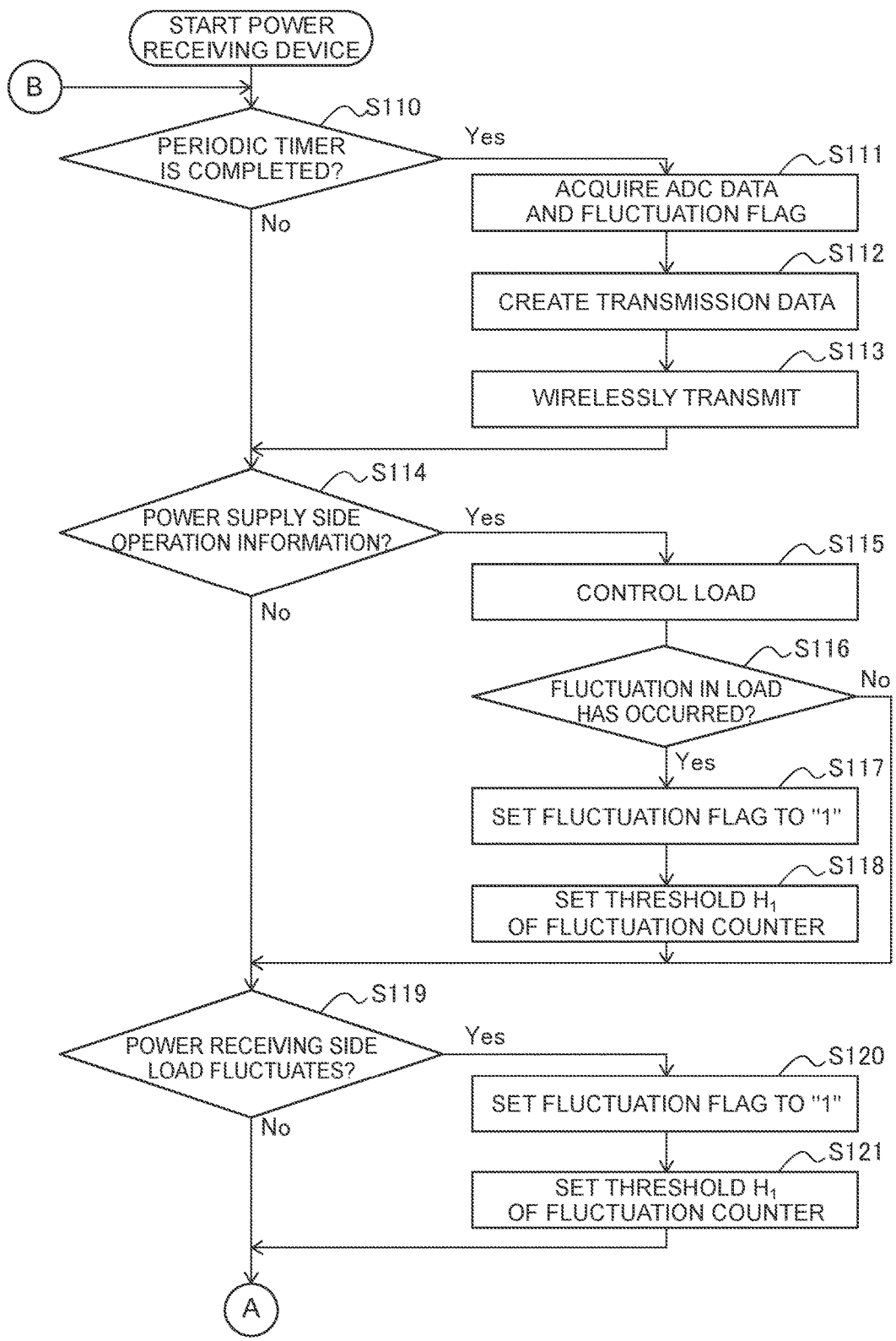
FIG. 15 is a first flowchart illustrating the process of a power receiving device in the second embodiment.
Figures 16, 17:
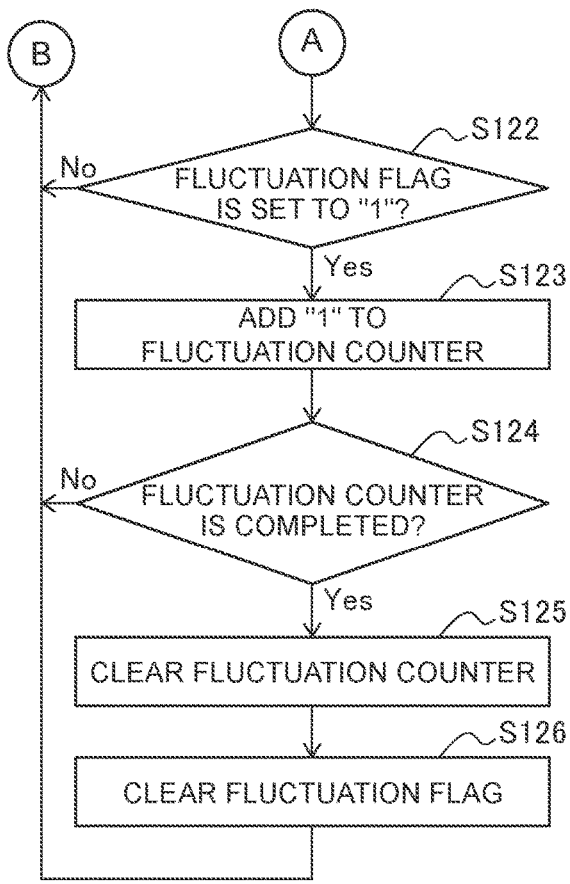
FIG. 16 is a second flowchart illustrating the process of the power receiving device in the second embodiment.
FIG. 17 is a diagram illustrating a threshold table storing the correspondence between an operation or fluctuation in load, and a threshold of a fluctuation counter in the second embodiment.

FIG. 15 and FIG. 16 are each a flowchart illustrating the process of the power receiving device 2.

The process illustrated in FIG. 15 and FIG. 16 is started when the processor 27 of the power receiving device 2 is started.

When the periodic timer is completed (Yes in step S110), the processor 27 acquires, from the A/D converter 272, A/D conversion data obtained by converting the detection voltage V3 to digital, and further acquires a fluctuation flag (step S111). The periodic timer of the second embodiment is completed every 7.5 milliseconds. Note that in FIG. 15, the A/D converter 272 is abbreviated as "ADC," and the A/D conversion data abbreviated as "ADC data." The fluctuation flag (one example of the fluctuation information) is a flag of 1 bit indicating whether the fluctuation in the rectified voltage value is the expected fluctuation.

The processor 27 generates information about the rectified voltage value based on this A/D conversion data, creates transmission data based on the rectified voltage value and the fluctuation flag (step S112), and transmits the transmission data through the radio unit 26 (step S113). Then, the processor 27 proceeds to the process in step S114. This periodic timer is a timer for determining the period of transmitting the transmission data including the rectified voltage value and the fluctuation flag from the power receiving device 2 to the power supply device 1.

If the periodic timer is not completed in step S110 (No in step S110), the processor 27 proceeds to the process in step S114.

If the processor 27 receives the communication packet including the operation information of the load part 25 from the power supply device 1 in step S114 (Yes), the processor 27 controls the load part 25 according to the operation information (step S115). The processor 27 refers to the threshold table 273 illustrated in FIG. 17, and determines whether the operation according to the operation information causes the load fluctuation (step S116). If the operation according to the operation information causes the load fluctuation (Yes in step S116), the processor 27 sets the fluctuation flag to "1" (step S117), and sets the threshold $H_1$ of the fluctuation counter (step S118). Then, the processor 27 proceeds to the process in step S119. Note that the fluctuation counter is a counter for setting a period until the fluctuation flag is cleared.

If the operation according to the operation information does not cause the load fluctuation (No in step S116), the processor 27 proceeds to the process in step S119. Note that the operation information causing the load fluctuation means that when the load 29 is, for example, an LED (Light Emitting Diode), the voltage drop occurs when the load 29 is turned on or the kickback voltage is generated when the load 29 is turned off.

The period of load fluctuation according to the operation differs depending on the configuration of the power receiving device 2. The processor 27 of the power receiving device 2 in the second embodiment sets a threshold $H_1$ of the fluctuation counter according to the expected fluctuation in load.

If the processor 27 does not receive the communication packet including the operation information of the load part 25 in step S114 (No), the processor 27 proceeds to the process in step S119.

In step S119, the processor 27 refers to the threshold table 273 illustrated in FIG. 17 to determine whether the fluctuation in load occurs according to the reason on the power receiving side. If the fluctuation in load occurs according to the reason on the power receiving side (Yes in step S119), the processor 27 sets the fluctuation flag to "1" (step S120), and sets the threshold $H_1$ of the fluctuation counter (step S121). Then, the processor 27 proceeds to the process in step S122. If the fluctuation in load does not occur according to the reason on the power receiving side in step S119 (No), the processor 27 proceeds to the process in step S122. Note that the fluctuation in load according to the reason on the power receiving side occurs when a switch for turning on/off the load 29 is provided on the power receiving side, or when the load 29 is turned on/off using a timer, for example.

Note that even when the expected fluctuation in load occurs in the power receiving device 2, the voltage drop occurs for about one sec. when the LED load is slow-started, for example. Thus, the processor 27 does not set the fluctuation flag to "1" to prevent the processor 27 from being unable to monitor the voltage for a long period of time.

If the fluctuation flag is set to "1" in step S122 (Yes), the processor 27 adds a "1" to the fluctuation counter (step S123). If the fluctuation flag is cleared (No in step S122), the processor 27 returns to the process in step S110.

Furthermore, if the fluctuation counter reaches threshold $H_1$ and the counting is completed (Yes in step S124), the processor 27 clears the fluctuation counter to zero (initialized) (step S125). Then the processor 27 clears the fluctuation flag (step S126), and returns to the process in step S110. If the fluctuation counter does not reach threshold $H_1$ and the counting is not completed in step S124 (No), the processor 27 returns to the process in step S110.

In the second embodiment, the fluctuation flag (one example of the fluctuation information) is added to the communication packet of the rectified voltage value to be wirelessly transmitted to the power supply device 1 from the power receiving device 2. The fluctuation flag is set when the voltage on the power receiving side fluctuates by the operation data wirelessly transmitted to the power receiving device 2 from the power supply device 1, and the expected fluctuation in load due to change on the power receiving device 2 side. The operation data includes, for example, turn-on/turn-off of the load, and the change in the driving state of load. Examples of the change on the power receiving device 2 side include autonomous turn-on/turn-off of the load by the upper system of the power receiving device 2, and the changes in the autonomous driving state of load. This fluctuation flag is cleared when the predetermined time has elapsed. The power receiving device 2 defines the period of time for setting the fluctuation flag according to the operation data or the change on the power receiving device 2 side.

If an unexpected fluctuation in load has occurred in the power receiving device 2, the fluctuation flag is cleared. Examples of unexpected fluctuations in load of the power receiving device 2 include fluctuation in power source voltage on the power supply device 1 side and fluctuation in space between the power receiving coil 12 and the power supply coil L1. Thus, the power receiving device 2 can show the power supply device 1 whether or not the fluctuation in load and the fluctuation period of the load are expected by the fluctuation flag.

FIG. 17 is a diagram illustrating the threshold table 273 storing the correspondence between the operation on the power supply side or the change on the power receiving side, and the threshold of the fluctuation counter.

The threshold table 273 is configured to include a column for the power supply-side operation/the power receiving-side change, a column for the occurrence of the fluctuation in load, and a column for a threshold. The column for the power supply-side operation/the power receiving-side change indicates the operation on the power supply side or the change on the power receiving side. The column for the occurrence of the fluctuation in load indicates whether the fluctuation in load occurs. The column for the threshold indicates a threshold of the fluctuation counter when the load fluctuates.

When the operation on the power supply side or the change on the power receiving side is the turn-on of the LED power source (load 29), the fluctuation in load occurs, and the threshold of the fluctuation counter at that time is 12. In other words, when the LED power source is turned on as the operation on the power supply side, the fluctuation flag is set over 90 milliseconds.

When the operation on the power supply side or the change on the power receiving side is the turn-off of the LED power source, the fluctuation in load occurs, and the threshold of the fluctuation counter at that time is 10. In other words, when the LED power source is turned off as the operation on the power supply side, the fluctuation flag is set over 75 milliseconds.

When the operation on the power supply side or the change on the power receiving side is the light control and the light quantity of +10%, the fluctuation in load occurs, and the threshold of the fluctuation counter at that time is 7.

In other words, when the operation on the power supply side is the light control of changing the light quantity by +10%, the fluctuation flag is set over 52.5 milliseconds.

When the operation on the power supply side or the change on the power receiving side is the light control and the light quantity of −10%, the fluctuation in load occurs, and the threshold of the fluctuation counter at that time is 5. In other words, when the operation on the power supply side is the light control of changing the light quantity by −10%, the fluctuation flag is set over 37.5 milliseconds.

When the operation on the power supply side or the change on the power receiving side is the color toning, the fluctuation in load does not occur. In other words, when the operation on the power supply side is the color toning, the fluctuation flag is left cleared.

When the operation on the power supply side or the change on the power receiving side is the LED slow start, the fluctuation in load occurs over a relatively long period of time. The column for the occurrence of the fluctuation in load shows "No" to prevent the voltage from being unable to be monitored over a long period of time. In other words, when the operation on the power supply side is the LED slow start, the fluctuation flag is left cleared. In this case, the processor 17 on the power supply side detects abnormality by an out of range counter and an out of range expanding counter (described later).

The processor 27 on the power receiving side controls the load 29 according to the operation information on the power supply device 1 side. When the fluctuation in load by control of the load 29 is expected based on this threshold table 273, the processor 27 can set the fluctuation information over a predetermined period of time.

Figure 18:
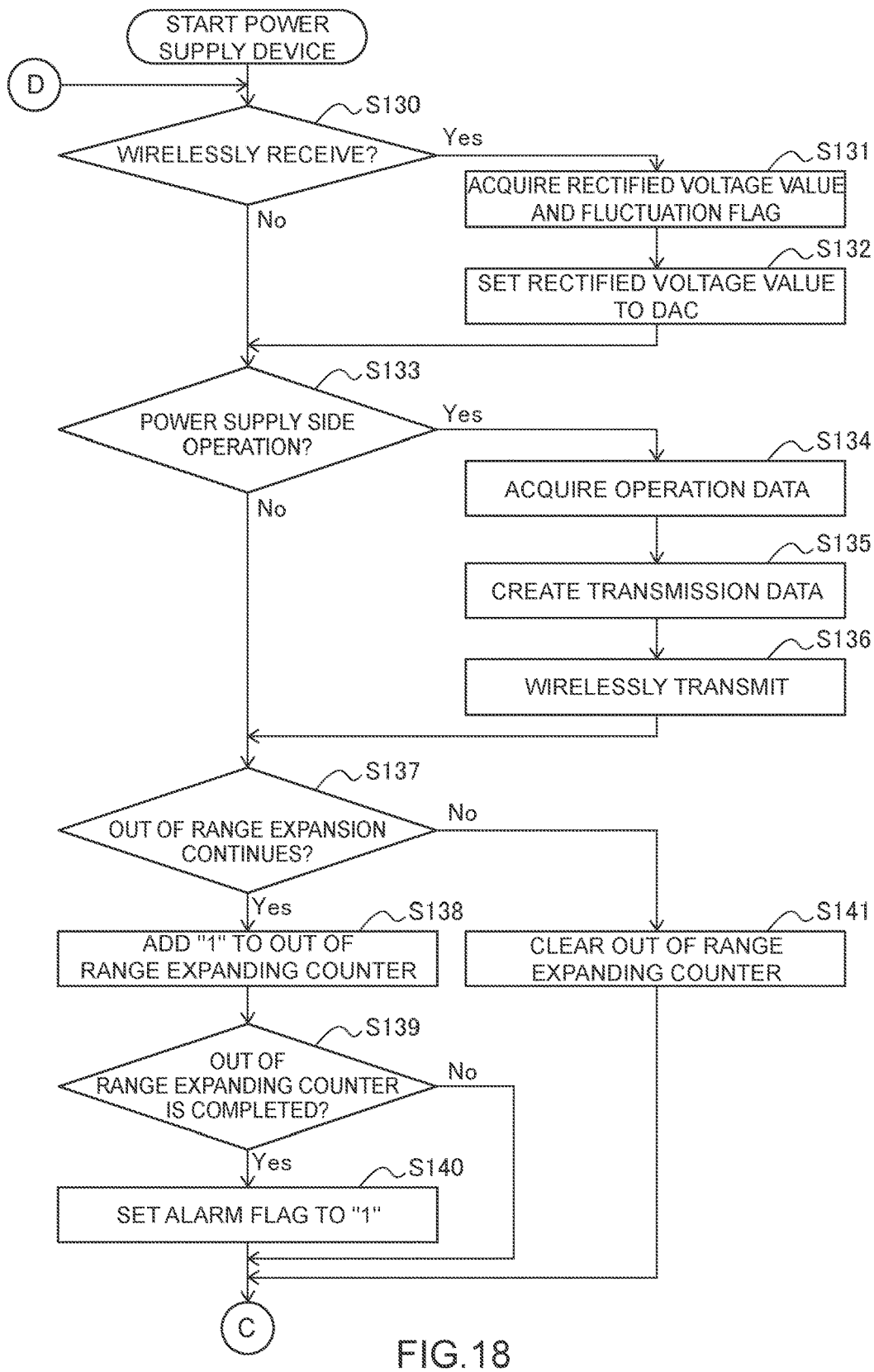
FIG. 18 is a first flowchart illustrating the process of a power supply device in the second embodiment.
Figure 19:
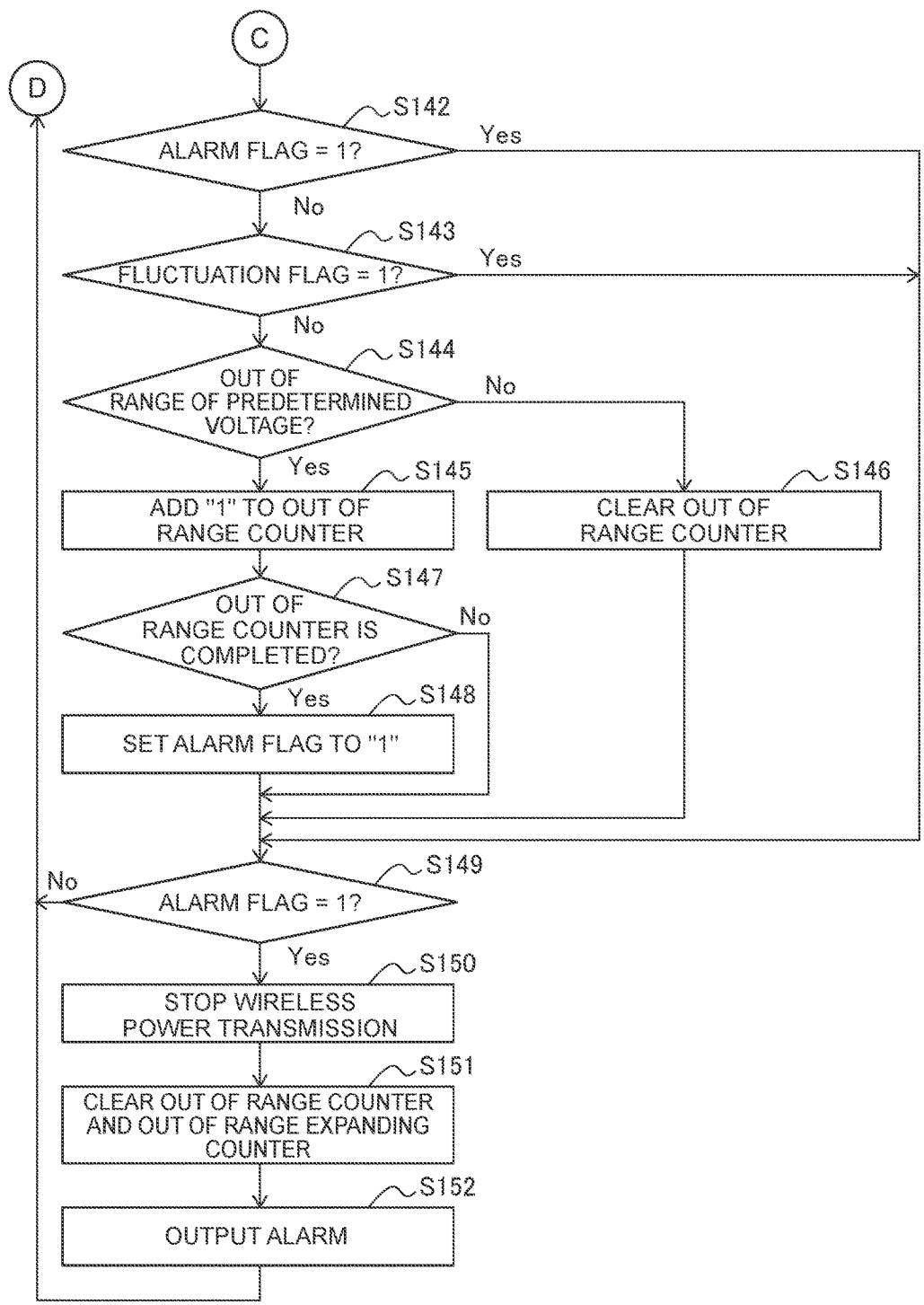
FIG. 19 is a second flowchart illustrating the process of the power supply device in the second embodiment.

FIG. 18 and FIG. 19 each is a flowchart illustrating the process of the power supply device 1.

The process illustrated in FIG. 18 and FIG. 19 is started when the processor 17 of the power supply device 1 is started.

When the processor 17 has received the communication packet through the radio unit 16 (Yes in step S130), the processor 17 acquires the rectified voltage value and the fluctuation flag from the communication packet (step S131). The processor 17 further sets the rectified voltage value to the D/A converter 172 (step S132) and proceeds to the process of step S133. Note that the communication packet is transmitted from the power receiving device 2 in a predetermined period of time.

If the processor 17 does not receive the communication packet through the radio unit 16 in step S130 (No), the processor 17 proceeds to the process of step S133.

If the operation part 19 has detected an operation instruction in step S133 (Yes), the processor 27 acquires the operation data (step S134), and creates the transmission data from the operation data (step S135). Furthermore, the processor 27 wirelessly transmits the transmission data (step S136), and proceeds to the process in step S137.

If the operation part 19 does not detect an operation instruction in step S133 (No), the processor 27 proceeds to the process in step S137.

Figure 22:
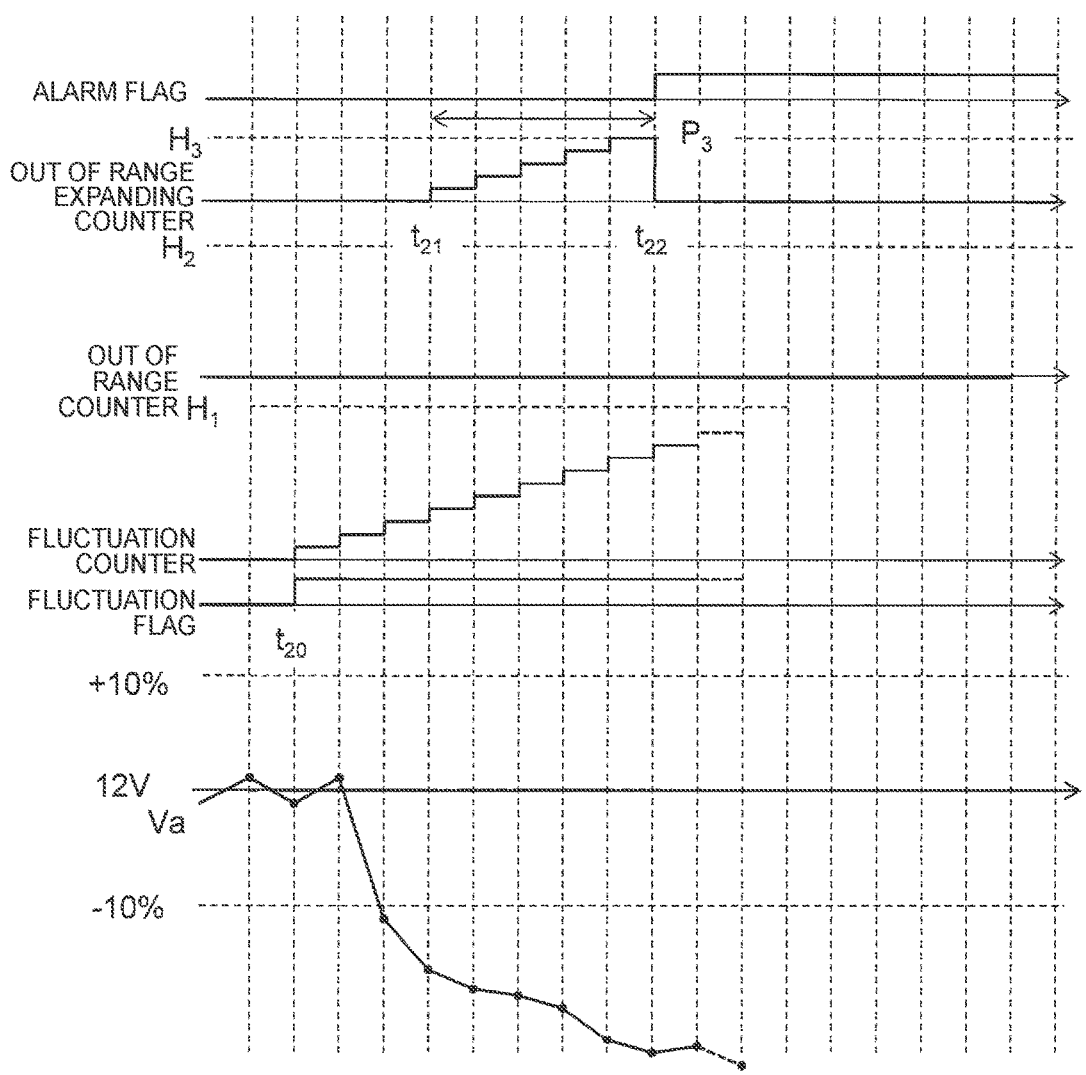
FIG. 22 is a timing chart showing a case where a fluctuation flag is set, a fluctuation counter is counted, the voltage on the power receiving side is outside of the predetermined voltage range over the predetermined period of time or more, and changes in a direction of expanding a difference from a target value, in the second embodiment.

If the rectified voltage value is out of the predetermined voltage range (12 V±10%) and a difference between the rectified voltage value and a target value (12 V) continues to be expanded in step S137 (Yes), the processor 17 adds a "1" to the out of range expanding counter (step S138). Furthermore, if the out of range expanding counter reaches a threshold $H_3$ and is completed (Yes in step S139), the processor 17 sets the alarm flag to "1" (step S140), and proceeds to the process of step S142. Thus, when the difference between the rectified voltage value and the target value of the feedback (12 V) continues to be expanded over a predetermined period of time, the processor 17 can stop the inverter circuit 12 as the protection operation. Such an example in which the out of range expanding counter reaches the threshold $H_3$ is illustrated in FIG. 22 (described later).

If the out of range expanding counter does not reach the threshold $H_3$ in step S139 (No), the processor 17 proceeds to the process of step S142.

If the rectified voltage value is out of the predetermined voltage range and the difference between the rectified voltage value and the target value does not continue to be expanded in step S137 (No), the processor 17 clears the out of range expanding counter (step S141), and proceeds to the process of step S142.

If the alarm flag is set to "1" in step S142 (Yes), the processor 17 proceeds to the process in step S149. On the other hand, if the alarm flag is not set to "1" in step S142 (No), the processor 17 proceeds to the process in step S143. Then, if the fluctuation flag is set to "1" in step S143 (Yes), the processor 17 proceeds to the process in step S149.

If the fluctuation flag is not set to "1" in step S143 (No), the processor 17 proceeds to the process in step S144, and determines whether the rectified voltage value is out of the predetermined voltage range.

If the rectified voltage value is out of the predetermined voltage range in step S144 (Yes), the processor 17 adds a "1" to the out of range counter (step S145).

Furthermore, if the out of range counter reaches the threshold $H_2$ and is completed (Yes in step S147), the processor 17 sets the alarm flag to "1" (step S148), and proceeds to the process in step S149. Thus, the processor 17 can stop the inverter circuit 12 as the protection operation.

Figure 21:
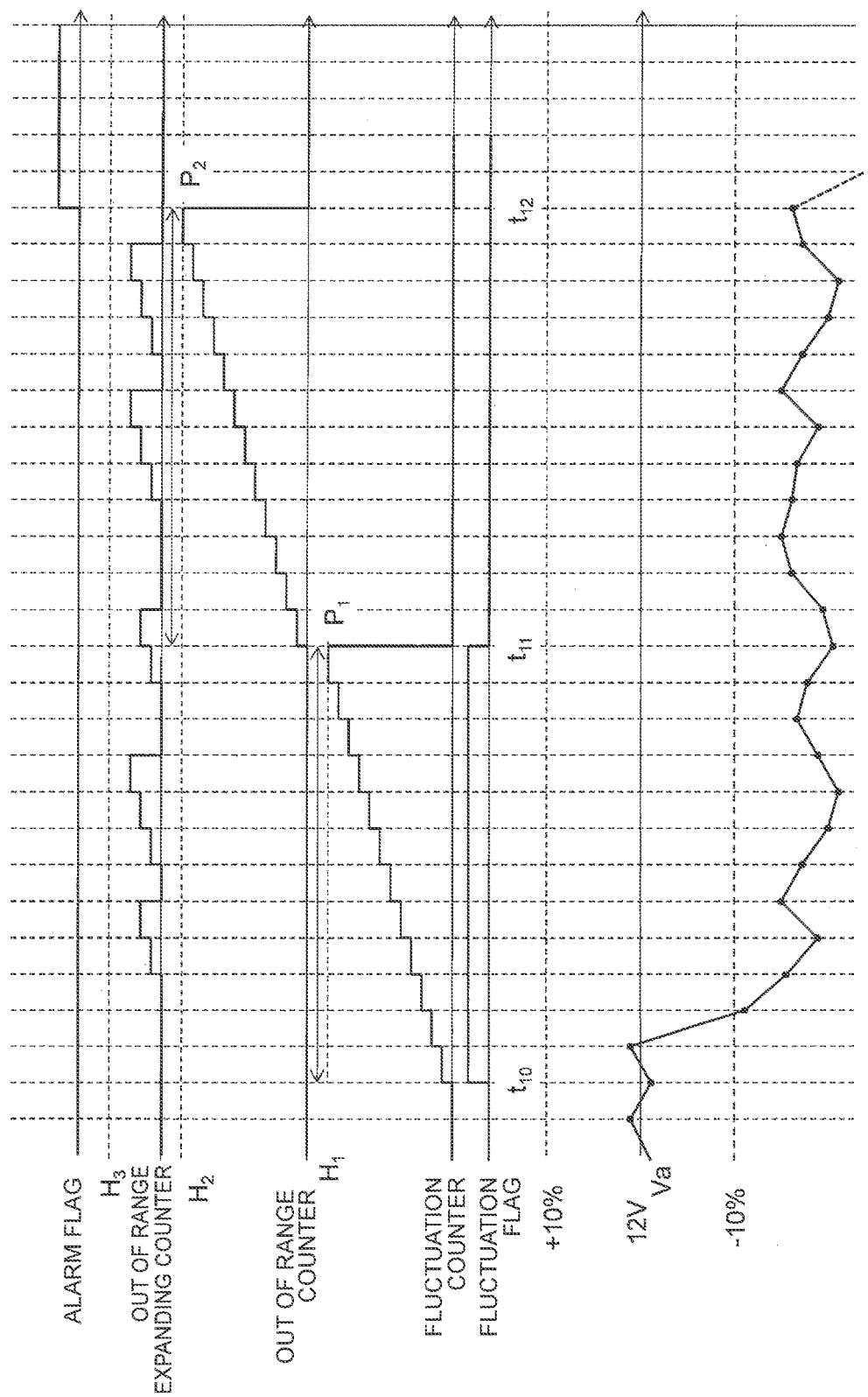
FIG. 21 is a timing chart showing a case where a voltage on the power receiving side is outside of a predetermined voltage range over a predetermined period of time or more in the second embodiment.

Such an example in which the out of range counter reaches the threshold $H_2$ is illustrated in FIG. 21 described later.

If the out of range counter does not reach the threshold $H_2$ in step S147 (No), the processor 17 proceeds to the process in step S149.

If the rectified voltage value is not out of the predetermined voltage range in step S144 (No), the processor 17 clears the out of range counter (step S146), and proceeds to the process in step S149.

If the alarm flag is set to "1" in step S149 (Yes), the processor 17 stops the inverter circuit 12 as the protection operation to stop the wireless power transmission (step S150). Furthermore, the processor 17 clears the out of range counter and the out of range expanding counter (step S151), and outputs the alarm (step S152), and returns to the process in step S130. Thus, if the fluctuation flag is cleared and the rectified voltage value is out of the predetermined voltage range over the predetermined period of time, the processor 17 can stop the inverter circuit 12 as the protection operation.

If the alarm flag is not set to "1" in step S149 (No), the processor 17 returns to the process in step S130, and continues the drive of the inverter circuit 12.

The radio unit 26 of the power supply device 1 receives the rectified voltage value and the fluctuation flag in every communication period. The power supply device 1 continues the drive of the inverter circuit 12 without performing the protection operation even if the rectified voltage value is out of the predetermined voltage range when the fluctuation flag is set. However, if the rectified voltage value is out of the predetermined voltage range over the predetermined period of time when the fluctuation flag is cleared, the power supply device 1 stops the inverter circuit 12 for the protection operation, and outputs the alarm to the notification part 10 of the upper system. By this, the power supply device 1 is able to stop the wireless power transmission as the protection operation when a voltage fluctuation not expected by the power receiving device 2 has occurred, and not to stop the wireless power transmission when a voltage fluctuation expected by the power receiving device 2 has occurred.

If the rectified voltage is out of the predetermined voltage range and the difference from the target value continues to be expanded, the power supply device 1 adds the out of range expanding counter in every periodic timer. When the out of range expanding counter set by the user in advance is completed, the power supply device 1 stops the inverter circuit 12 for the protection operation, stops the wireless power transmission, and outputs the alarm to the notification part 10 of the upper system. Thus, the power supply device 1 can stop the wireless power transmission even at an abnormal time when the voltage continues to change in a direction of expanding the difference from the target value of the feedback control.

Figure 20:
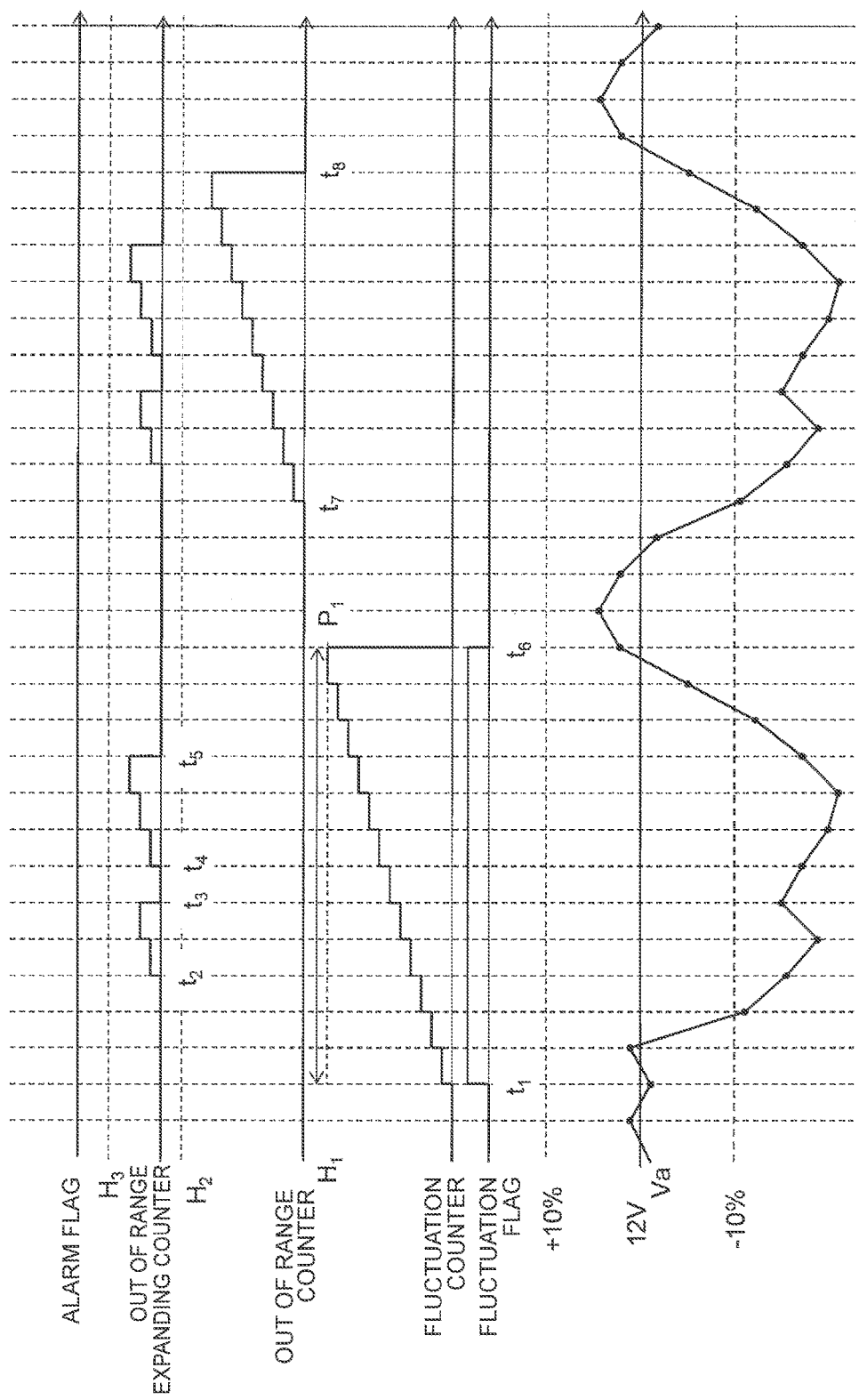
FIG. 20 shows a timing chart at a normal operation in the second embodiment.

The timing charts shown in FIG. 20 through FIG. 22 each show the alarm flag, the out of range expanding counter, the out of range counter, the fluctuation counter, the fluctuation flag, and the rectified voltage value in this order from above. The fluctuation flag and the rectified voltage value among these items are included in the transmission data to be transmitted to the power supply device 1 from the power receiving device 2.

The fluctuation counter is internal information controlled by the processor 27 of the power receiving device 2. The alarm flag, the out of range expanding counter, and the out of range counter are internal information controlled by the processor 17 of the power supply device 1.

FIG. 20 shows a timing chart at a normal operation.

At a time $t_1$, the operation part 19 of the power supply device 1 is operated. The operation is an operation for turning on the load part 25, for example. Thus, the processor 27 of the power receiving device 2 sets the fluctuation flag to "1," and starts the counting of the fluctuation counter.

At a time $t_2$, since the rectified voltage Va is out of a predetermined range of 12 V±10% successively to one preceding period, and the difference from the target value of 12 V is expanded more than the difference in the one preceding period, the processor 17 starts the counting of the out of range expanding counter.

At a time $t_3$, since the rectified voltage Va is out of the predetermined voltage range, but the difference from the target value is reduced compared to the difference in one preceding period, the processor 17 clears the out of range expanding counter.

At a time $t_4$, since the rectified voltage Va is out of the predetermined voltage range, and the difference from the target value is expanded more than the difference in the one preceding period, the processor 17 starts the counting of the out of range expanding counter.

At a time $t_5$, since the rectified voltage Va is out of the predetermined voltage range, but the difference from the target value is reduced compared to the difference in one preceding period, the processor 17 clears the out of range expanding counter.

At a time $t_6$, the processor 27 of the power receiving device 2 completes the counting of the fluctuation counter, and clears the fluctuation flag. A period $P_1$ shown in the figure indicates a period from a start of the counting of the fluctuation counter by the processor 27 of the power receiving device 2 to a completion of the counting. The period $P_1$ is set as a maximum period of time from the time when the fluctuation in load converges by contents operated to the load part 25 at the time $t_1$ to the time when the rectified voltage Va returns within the predetermined voltage range again. The period $P_1$ is determined by combining the fluctuation counter and the threshold $H_1$.

At a time $t_7$, since the rectified voltage Va is out of the predetermined voltage range in a state where the fluctuation flag is cleared, the processor 17 starts the counting of the out of range counter. At a time $t_8$, since the rectified voltage Va returns within the predetermined voltage range, the processor 17 clears the out of range counter. Thus, in a short period of time in which a problem does not occur in the drive of the load 29 even if the rectified voltage Va is out of the predetermined range of 12 V±10%, the processor 17 is adapted not to perform the protection operation. Thus, the load 29 (upper system) can continuously operate.

FIG. 21 is a timing chart showing a case where the alarm flag is set to "1" because the voltage on the power receiving side is out of the predetermined voltage range.

At a time $t_{10}$, the operation part 19 of the power supply device 1 is operated. The operation is an operation for turning on the load part 25, for example. Thus, the processor 27 of the power receiving device 2 sets the fluctuation flag to "1" to start the counting of the fluctuation counter.

At a time $t_{11}$, the processor 27 of the power receiving device 2 completes the counting of the fluctuation counter, and clears the fluctuation flag. At this time, since the rectified voltage Va is out of the predetermined range of 12 V±10%, the processor 17 starts the counting of the out of range counter. Hereafter, the rectified voltage Va is left out of the predetermined voltage range over the period $P_2$.

At a time $t_{12}$, since the rectified voltage Va is left out of the predetermined voltage range, and the out of range counter reaches the threshold $H_2$ and completes the counting, the processor 17 sets the alarm flag to "1" and stops the wireless power transmission for the protection operation. Thus, the notification part 10 notifies the user of the alarm. The period $P_2$ is determined by combining the out of range counter and the threshold $H_2$.

FIG. 22 is a timing chart showing a case where the fluctuation flag is set, the fluctuation counter is counted, and the voltage on the power receiving side is out of the predetermined voltage range over the predetermined period of time or more, and changes in a direction of expanding the difference from the target value. The target value in the second embodiment is 12 V, and the predetermined voltage range is 12 V±10%.

At a time $t_{20}$, the operation part 19 of the power supply device 1 is operated. The operation is an operation for turning on the load part 25, for example. Thus, the processor 27 of the power receiving device 2 sets the fluctuation flag to "1," and starts the counting of the fluctuation counter.

At a time $t_{21}$, since the rectified voltage Va is out of a predetermined range of 12 V±10% successively to one preceding period, and the difference from the target value of 12 V is expanded more than the difference in the one preceding period, the processor 17 starts the counting of the out of range expanding counter. Hereafter, the rectified voltage Va is left out of the predetermined voltage range over the period $P_3$, and the difference from the target value continues to be expanded more than the difference in the one preceding period.

At a time $t_{22}$, the out of range expanding counter reaches the threshold $H_3$, and the processor 17 completes the counting. When the counting of the out of range expanding counter has been completed, the processor 17 sets the alarm flag to "1", and stops the wireless power transmission for the protection operation. Thus, the notification part 10 notifies the user of the alarm. The period $P_3$ is determined by combining the out of range expanding counter and the threshold Ha.

(Modifications)

The present disclosure is not limited to the above-described second embodiment, and can be modified and implemented within a scope not deviating from the gist of the disclosure, as described in the modifications (a) to (g) in the above-described first embodiment and (j) to (m) below, for example.

(j) A method of notifying the fluctuation in load to the power supply device 1 from the power receiving device 2 is not limited to the fluctuation flag of 1 bit. The power receiving device 2 may notify the fluctuation in load to the power supply device 1 using the fluctuation information of any bit-width.

(k) The threshold table 273 may not be stored in EEPROM, or the like, and a threshold value may be changed by transmitting data from the upper system of the power supply device 1.

(l) The target value is not limited to 12 V, and the predetermined voltage range is not limited to 12 V±10%. For example, the predetermined voltage range may include the target value, and is not limited to 12 V±10%.

(m) In step S150 in FIG. 19, the power supply device 1 may wirelessly transmit the alarm information to the power receiving device 2 before the power supply device 1 stops the wireless power transmission, and the power receiving device 2 may turn off the DC/DC converter 23 and output the alarm to the upper system of the power receiving device 2 from the input/output circuit 271.

What is claimed is:

1. A wireless power transmission system comprising a power supply device and a power receiving device,
   the power supply device comprising:
   a power supply coil wirelessly transmitting electric power;
   an inverter driving the power supply coil;
   a first radio unit performing radio communication with the power receiving device; and
   a first processor controlling the first radio unit and the inverter, and
   the power receiving device comprising:
   a resonant circuit including a power receiving coil wirelessly receiving electric power from the power supply coil of the power supply device and a capacitor to generate a resonant voltage;
   a rectifying circuit rectifying the resonant voltage to output a rectified voltage;
   a second radio unit performing radio communication with the first radio unit included in the power supply device; and
   a second processor controlling the second radio unit,
   wherein the second processor transmits a communication packet to the power supply device in a predetermined period of time, the communication packet including information about a rectified voltage value generated based on the rectified voltage and a circulation index value indicating transmission sequence and
   the first processor outputs a signal according to the rectified voltage value included in the communication packet every time the first processor receives the communication packet without delay.

2. The wireless power transmission system according to claim 1, wherein
   the second processor adds a predetermined value to the circulation index value every time the second processor transmits the communication packet to the power supply device.

3. The wireless power transmission system according to claim 2, wherein
   the second processor adds a predetermined value to the circulation index value every time the second processor transmits the communication packet to the power supply device, the circulation index value is set to a minimum value within a predetermined range when the circulation index value is above a maximum value within the predetermined range, and the circulation index value is set to the maximum value within the predetermined range when the circulation index value is below the minimum value within the predetermined range.

4. The wireless power transmission system according to claim 1, wherein
   the first processor determines a delay of a present communication packet based on a reception interval between a preceding communication packet and the present communication packet, and a difference between circulation index values included in the preceding communication packet and the present communication packet, and ignores the present communication packet if the present communication packet is delayed for more than a predetermined time.

5. The wireless power transmission system according to claim 4, wherein
   the first processor restarts a periodic timer if the received present communication packet is not delayed for more than the predetermined time, and acquires a reception interval between a communication packet to be newly received and the present communication packet based on the periodic timer.

6. The wireless power transmission system according to claim 1, wherein
   the first processor performs a protection operation if the first processor does not receive the communication packet from the power receiving device over a predetermined period of time.

7. The wireless power transmission system according to claim 1, wherein
   the first processor determines the number of communication packet losses based on a reception interval between a preceding communication packet and the present communication packet, and a difference between circulation index values included in the preceding communication packet and the present communication packet, and instructs the power receiving device to increase a radio output level if an accumulated value of the number of communication packet losses exceeds a predetermined threshold.

8. The wireless power transmission system according to claim 7, wherein
   the first processor further instructs the power receiving device to maximize the radio output level and performs a protection operation if the accumulated value of the number of communication packet losses exceeds a predetermined threshold.

9. The wireless power transmission system according to claim 7, wherein
   the first processor instructs the power receiving device to decrease the radio output level if the first processor does not determine the communication packet loss over a predetermined period of time.

10. A communication method for a wireless power transmission system comprising a power supply device and a power receiving device,
the power supply device comprising:
a power supply coil wirelessly transmitting electric power;
an inverter driving the power supply coil;
a first radio unit performing radio communication with the power receiving device; and
a first processor controlling the first radio unit and the inverter, and
the power receiving device comprising:
a resonant circuit including a power receiving coil wirelessly receiving electric power from the power supply coil of the power supply device and a capacitor to generate a resonant voltage;
a rectifying circuit rectifying the resonant voltage to output a rectified voltage;
a second radio unit performing radio communication with the first radio unit included in the power supply device; and
a second processor controlling the second radio unit,
the communication method comprising:
transmitting by the second processor a communication packet to the power supply device in a predetermined period of time, the communication packet including information about a rectified voltage value generated based on the rectified voltage and a circulation index value indicating transmission sequence;
calculating by the first processor a reception interval between a preceding communication packet and a present communication packet;
determining by the first processor a delay of the present communication packet based on a difference between circulation index values included in the preceding communication packet and the present communication packet, and the reception interval; and
ignoring by the first processor the present communication packet if the present communication packet is delayed for more than a predetermined time.

11. A wireless power transmission system comprising a power supply device and a power receiving device,
the power supply device comprising:
a power supply coil wirelessly transmitting electric power;
an inverter driving the power supply coil;
a first radio unit performing radio communication with the power receiving device; and
a first processor controlling the first radio unit and the inverter, and
the power receiving device comprising:
a resonant circuit including a power receiving coil wirelessly receiving electric power from the power supply coil of the power supply device and a capacitor to generate a resonant voltage;
a rectifying circuit rectifying the resonant voltage to output a rectified voltage;
a load driven by the rectified voltage;
a second radio unit performing radio communication with the first radio unit included in the power supply device; and
a second processor controlling the load and the second radio unit,
wherein the second processor generates information about a rectified voltage value based on the rectified voltage, sets or clears fluctuation information indicating whether fluctuation in the rectified voltage value is expected fluctuation, and transmits information including the rectified voltage value and the fluctuation information to the first radio unit included in the power supply device.

12. The wireless power transmission system according to claim 11, wherein
the first processor included in the power supply device continues a control of the inverter if the fluctuation information received from the power receiving device is set, and performs a protection operation when a rectified voltage value according to the rectified voltage is out of a predetermined voltage range over a predetermined period of time if the fluctuation information received from the power receiving device is cleared.

13. The wireless power transmission system according to claim 11, wherein
the power supply device further includes an operation part for inputting operation information of the load,
the first processor included in the power supply device transmits the operation information input from the operation part to the second radio unit through the first radio unit,
the second processor included in the power receiving device controls the load according to the operation information received by the second radio unit, and sets the fluctuation information over a predetermined period of time if fluctuation in the load is expected.

14. The wireless power transmission system according to claim 11, wherein
the second processor included in the power receiving device sets the fluctuation information over the predetermined period of time if the fluctuation in the load is expected.

15. The wireless power transmission system according to claim 11, wherein
the first processor included in the power supply device performs a protection operation if a difference between the rectified voltage value received from the second radio unit and a target value of a feedback continues to be expanded over a predetermined period of time.

16. The wireless power transmission system according to claim 11, wherein
the fluctuation information is a flag of 1 bit.

17. A protection method for a wireless power transmission system comprising a power supply device and a power receiving device,
the power supply device comprising:
a power supply coil wirelessly transmitting electric power;
an inverter driving the power supply coil;
a first radio unit performing radio communication with the power receiving device; and
a first processor controlling the first radio unit and the inverter, and
the power receiving device comprising:
a resonant circuit including a power receiving coil wirelessly receiving electric power from the power supply coil of the power supply device and a capacitor to generate a resonant voltage;
a rectifying circuit rectifying the resonant voltage to output a rectified voltage;
a load driven by the rectified voltage;
a second radio unit performing radio communication with the first radio unit included in the power supply device; and
a second processor controlling the load and the second radio unit, the communication method comprising:
generating by the second processor information about a rectified voltage value based on the rectified voltage;
setting or clearing by the second processor fluctuation information indicating whether fluctuation in the rectified voltage value is expected fluctuation; and
transmitting by the second processor information including the rectified voltage value and the fluctuation information to the first radio unit included in the power supply device;
continuing by the first processor control of the inverter when the fluctuation information received from the second radio unit is set; and
performing by the first processor a protection operation when the fluctuation information received from the second radio unit is not set and a rectified voltage value according to the rectified voltage is out of a predetermined voltage range over a predetermined period of time.

* * * * *